US012737352B2

(12) United States Patent
Zhuo et al.

(10) Patent No.: US 12,737,352 B2
(45) Date of Patent: Sep. 15, 2026

(54) GENERATING A MORE ACCURATE ANSWER BY ARTIFICIAL INTELLIGENCE CHATBOTS

(71) Applicant: International Business Machines Corporation, Armonk, NY (US)

(72) Inventors: Ling Zhuo, Beijing (CN); Yi Shan Jiang, Bejing (CN); Xiao Dong Wang, Beijing (CN); Yun Wang, Beijing (CN); He Sheng Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/010,697

(22) Filed: Jan. 6, 2025

(65) Prior Publication Data

US 2026/0195320 A1 Jul. 9, 2026

(51) Int. Cl.

| | |
|---|---|
| ***G06F 16/242*** | (2019.01) |
| ***G06F 16/2452*** | (2019.01) |
| ***G06F 16/248*** | (2019.01) |

(52) U.S. Cl.
CPC .... *G06F 16/2425* (2019.01); *G06F 16/24522* (2019.01); *G06F 16/248* (2019.01)

(58) Field of Classification Search
CPC ........... G06F 16/2425; G06F 16/24522; G06F 16/248
See application file for complete search history.

(56) References Cited

U.S. PATENT DOCUMENTS

| | | | | |
|---|---|---|---|---|
| 11,694,281 | B1 | 7/2023 | Liu et al. | |
| 12,099,975 | B1 | 9/2024 | Cai et al. | |
| 2007/0245306 | A1* | 10/2007 | Dameshek | G16Z 99/00 717/109 |
| 2014/0244429 | A1* | 8/2014 | Clayton | G06Q 30/0631 705/26.7 |
| 2017/0128059 | A1* | 5/2017 | Coe | A61B 17/3423 717/109 |

(Continued)

OTHER PUBLICATIONS

"Baidu's Chatbot", https://yiyan.baidu.com/, dated Mar. 5, 2025, 2 pages.

(Continued)

*Primary Examiner* — Yuk Ting Choi

(57) ABSTRACT

A computer-implemented method, system, and computer program product for generating a more accurate answer by an artificial intelligence chatbot. A first answer to a query requesting information is analyzed to extract conditions, decisions, and independent variables from the first answer. The first answer is generated and displayed to the user providing the query, where the first answer includes one or more of the extracted conditions, decisions, and independent variables which are highlighted to indicate to the user to provide feedback regarding such extracted conditions, decisions, and independent variables. After receiving input from the user regarding the highlighted conditions, decisions, and independent variables, a new query is generated. A new answer (a second answer) is then generated by the artificial intelligence chatbot based on this new query. The above-described process is repeated until the number of conditions, decisions, and independent variables identified in the answer is below a threshold number.

20 Claims, 10 Drawing Sheets

601 Q: How to open a new account in a bank?
602 A: To create a new account in a bank, you typically need to follow these steps:
603 1.Choose a Bank: Research and choose a bank that suits your needs. Consider factors such as location, services offered, fees, and account types.
603 2.Visit the Bank: Go to the nearest branch of the chosen bank. Some banks also allow online account opening, so you can check their website for options.
603 3.Select the Type of Account: Inform the bank representative about the type of account you want to open. Common types include savings accounts, checking accounts, and certificates of deposit.
603 4.Provide Identification: You will need to provide valid identification, s... as a government-issued ID (passport, Top N primary independent variables are hightlighted in the answer text, so that the user realizes that more information is being requested concerning these conditions, decisions, and independent variables

(56) References Cited

U.S. PATENT DOCUMENTS

2023/0043543 A1* 2/2023 Gnanasambandam ...................... G16H 50/70 717/109
2024/0265205 A1 8/2024 Goligorsky
2024/0281472 A1 8/2024 Larhette et al.

OTHER PUBLICATIONS

Authors et al.: Disclosed Without Attribution, IP.com No. IPCOM000272837D, A System and Method for Prompt Curation for LLMs: Constraining Input for LLMs, Aug. 17, 2023, 6 pages.
Bastola et al., "LLM-based Smart Reply (LSR): Enhancing Collaborative Performance with ChatGPT-mediated Smart Reply System", arXiv:2306.11980v5 [cs. HC], Mar. 4, 2024, 19 pages.
Liu et al., "Summary of ChatGPT-Related Research and Perspective Towards the Future of Large Language Models", arXiv:2304.01852v4, Aug. 22, 2023, 22 pages.

* cited by examiner

| Sequence | Condition/Decision/Independent Variable |
|---|---|
| 1 | Bank Selection |
| 2 | Account Type |
| 3.1 | Proof of Identity |
| 3.2 | Proof of Address |
| 3.3 | SSN |
| 4 | In-Person Visit |
| 5 | Bank Branch |
| 6 | Application Form Completion |
| 7 | Initial Deposit |

Figure 4:
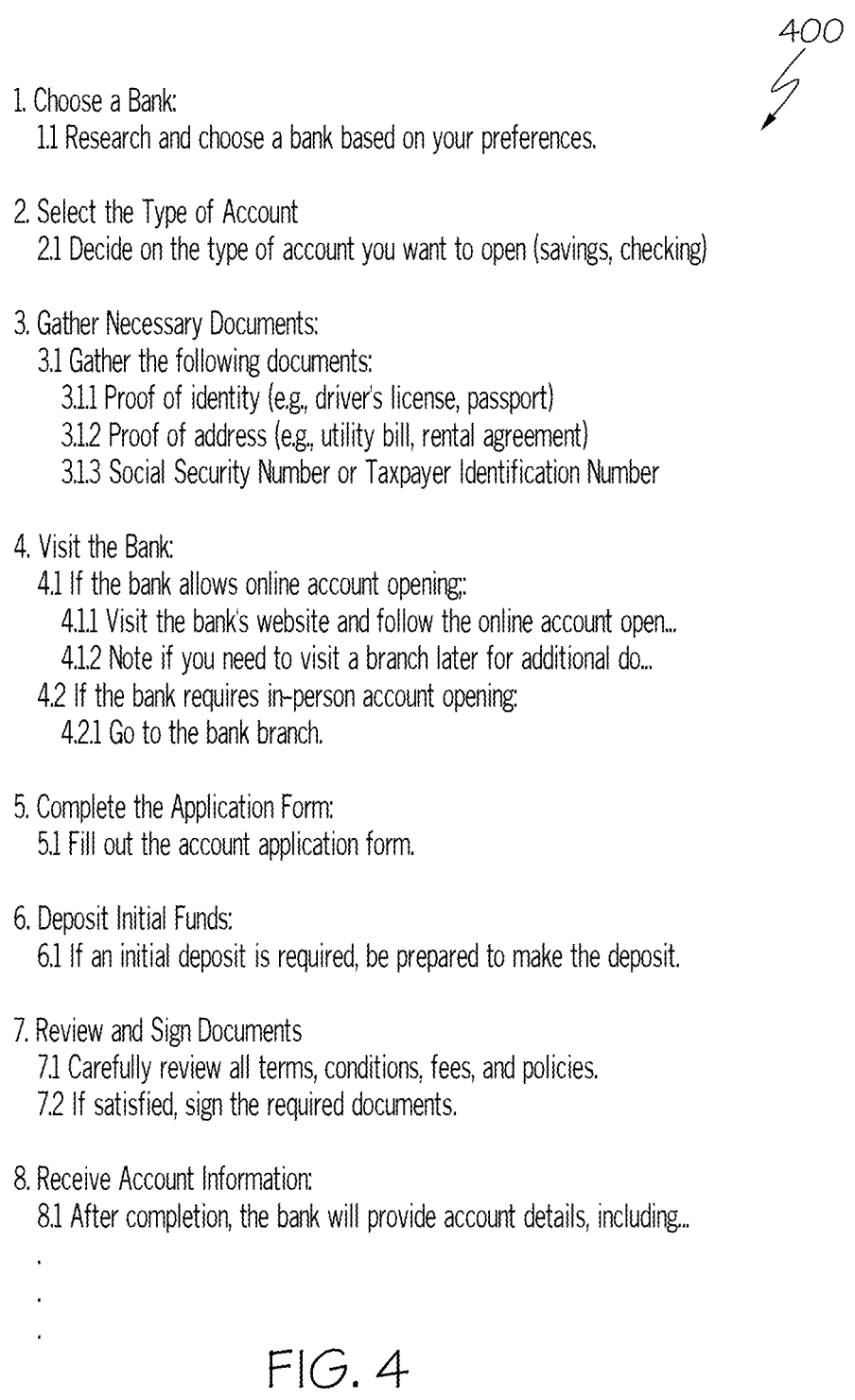

400

1. Choose a Bank:
   1.1 Research and choose a bank based on your preferences.

2. Select the Type of Account
   2.1 Decide on the type of account you want to open (savings, checking)

3. Gather Necessary Documents:
   3.1 Gather the following documents:
      3.1.1 Proof of identity (e.g., driver's license, passport)
      3.1.2 Proof of address (e.g., utility bill, rental agreement)
      3.1.3 Social Security Number or Taxpayer Identification Number 4. Visit the Bank:
   4.1 If the bank allows online account opening;:
      4.1.1 Visit the bank's website and follow the online account open...
      4.1.2 Note if you need to visit a branch later for additional do...
   4.2 If the bank requires in-person account opening:
      4.2.1 Go to the bank branch.

5. Complete the Application Form:
   5.1 Fill out the account application form.

6. Deposit Initial Funds:
   6.1 If an initial deposit is required, be prepared to make the deposit.

7. Review and Sign Documents
   7.1 Carefully review all terms, conditions, fees, and policies.
   7.2 If satisfied, sign the required documents.

8. Receive Account Information:
   8.1 After completion, the bank will provide account details, including...

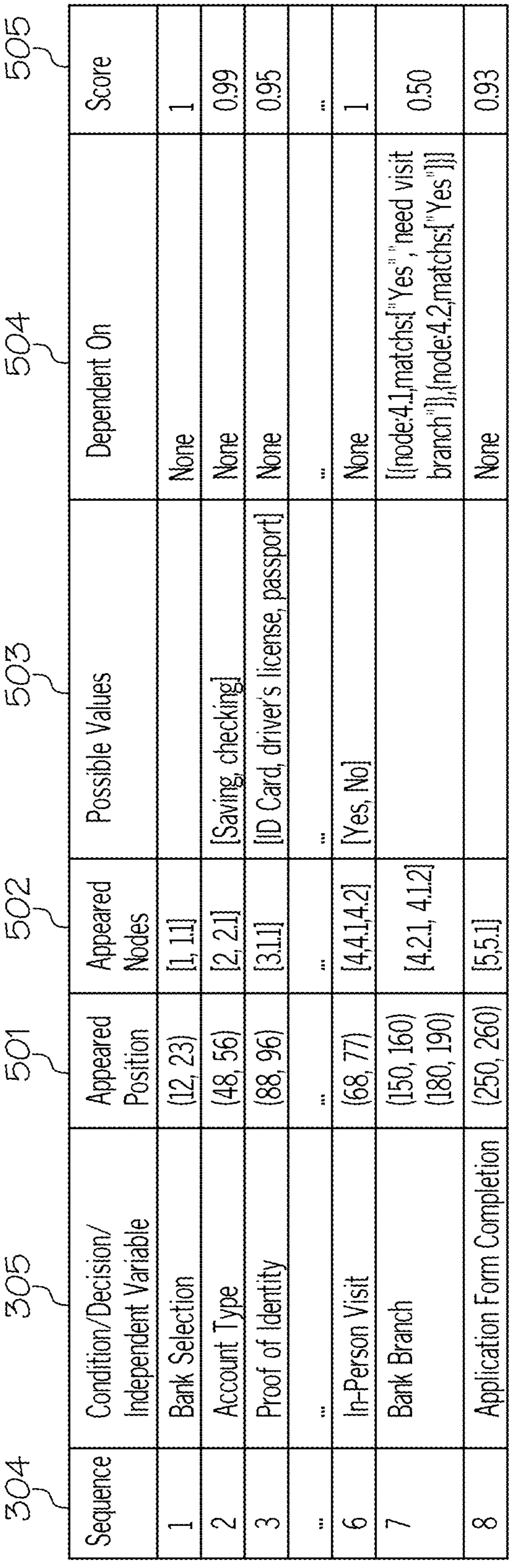

| Sequence | Condition/Decision/ Independent Variable | Appeared Position | Appeared Nodes | Possible Values | Dependent On | Score |
|---|---|---|---|---|---|---|
| 1 | Bank Selection | (12, 23) | [1, 1.1] | | None | 1 |
| 2 | Account Type | (48, 56) | [2, 2.1] | [Saving, checking] | None | 0.99 |
| 3 | Proof of Identity | (88, 96) | [3.1.1] | [ID Card, driver's license, passport] | None | 0.95 |
| ... | ... | ... | ... | ... | ... | ... |
| 6 | In-Person Visit | (68, 77) | [4,4.1,4.2] | [Yes, No] | None | 1 |
| 7 | Bank Branch | (150, 160) (180, 190) | [4.2.1, 4.1.2] | | [{node:4.1,matchs:["Yes","need visit branch"]},{node:4.2,matchs:["Yes"]}] | 0.50 |
| 8 | Application Form Completion | (250, 260) | [5,5.1] | | None | 0.93 |

FIG. 5

GENERATING A MORE ACCURATE ANSWER BY ARTIFICIAL INTELLIGENCE CHATBOTS

TECHNICAL FIELD

The present disclosure relates generally to artificial intelligence chatbots, and more particularly to generating a more accurate answer by artificial intelligence chatbots via user feedback on conditions, decisions, and independent variables identified in an original or previous answer generated by the artificial intelligence chatbot.

BACKGROUND

An artificial intelligence (AI) chatbot is a software program that uses artificial intelligence to simulate human-like conversations with users. AI chatbots are designed to understand a user's needs, preferences, and intent without the need for a human operator.

SUMMARY

In one embodiment of the present disclosure, a computer-implemented method for generating a more accurate answer by an artificial intelligence chatbot comprises receiving a query requesting information. The method further comprises analyzing semantics of the query. The method additionally comprises searching a knowledge base for a first answer to the query based on the analyzed semantics of the query. Furthermore, the method comprises analyzing the first answer to extract conditions, decisions, and independent variables in the first answer. Additionally, the method comprises generating and displaying the first answer including one or more of the extracted conditions, decisions, and independent variables which are highlighted in the first answer. The method further comprises generating a recommended query based on the received input. The method additionally comprises analyzing semantics of the recommended query. Furthermore, the method comprises searching the knowledge base for a second answer to the recommended query based on the analyzed semantics of the recommended query.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 4 illustrates a tree view of the workflow that was extracted from the answer to the query requesting information in accordance with an embodiment of the present disclosure;

FIG. 5 illustrates the scoring of the extracted conditions, decisions, and independent variables in accordance with an embodiment of the present disclosure;

DETAILED DESCRIPTION

Figure 1:
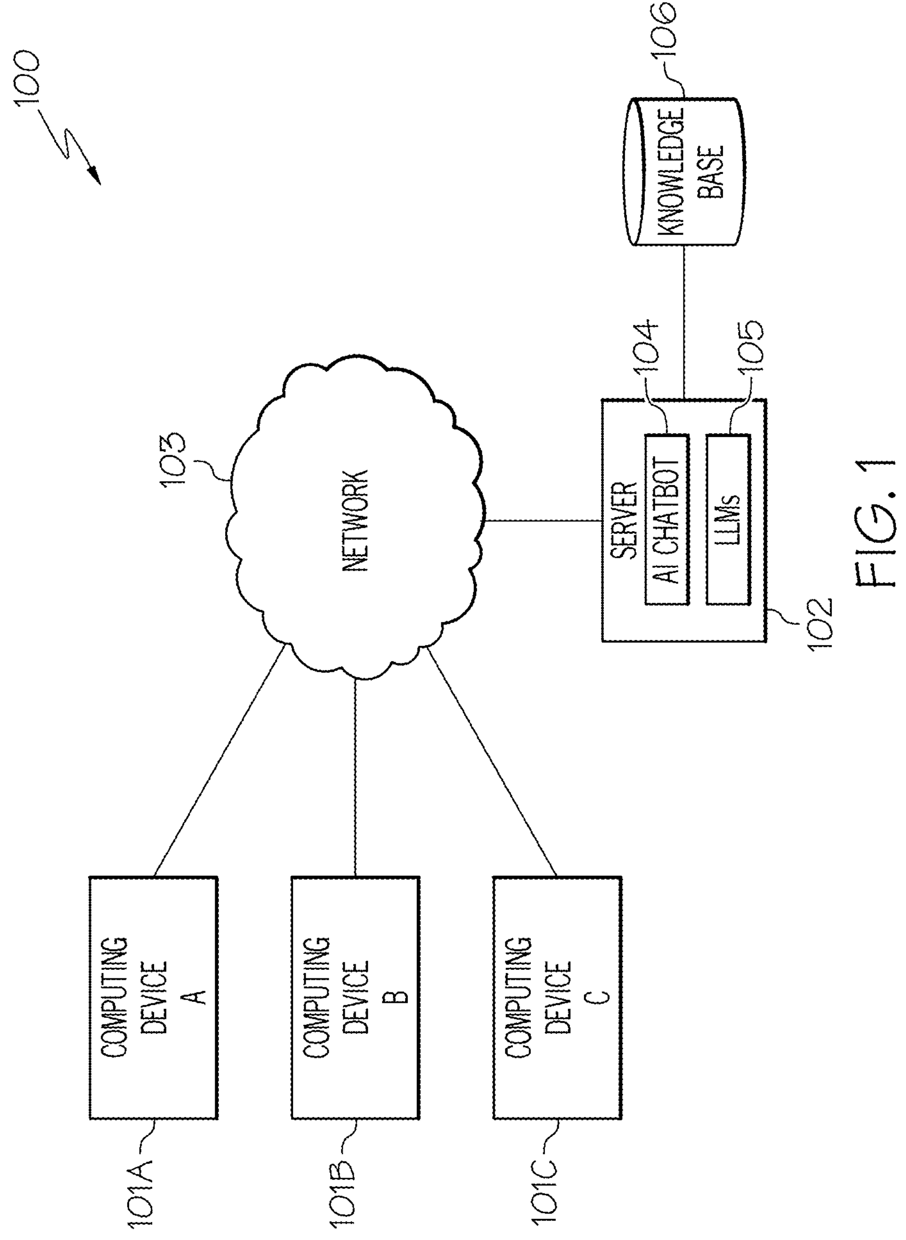
FIG. 1 illustrates a communication system for practicing the principles of the present disclosure in accordance with an embodiment of the present disclosure.

As stated above, an artificial intelligence (AI) chatbot is a software program that uses artificial intelligence to simulate human-like conversations with users. AI chatbots are designed to understand a user's needs, preferences, and intent without the need for a human operator.

For example, AI chatbots use natural language processing (NLP) and machine learning (ML) to understand and respond to user queries. They can adapt to user inputs over time and handle a wider range of issues more accurately and efficiently than traditional chatbots.

AI chatbots are used in a variety of applications, including customer service. For example, AI chatbots are used for answering frequently asked questions, providing product recommendations, and facilitating transactions.

AI chatbots are also used in e-commerce (e.g., providing personalized recommendations), healthcare (e.g., performing patient intake and appointment scheduling), market research (e.g., collecting survey responses), education (e.g., helping students with their homework), etc.

Unfortunately, such AI chatbots, such as OpenAI's ChatGPT®, may sometimes provide information that is not the best and comprehensive answer to the user's intended query. In certain situations, the AI chatbot does not provide the best and comprehensive answer to the user's query because the user did not formulate the query properly in order to correctly ask the intended question.

While attempts have been made to rephrase queries to the AI chatbot to better align with the user's intended meaning, such as providing additional context, such techniques are deficient in enabling the AI chatbot to provide information that is the best and comprehensive answer to the user's intended query.

The embodiments of the present disclosure provide a means for enabling the AI chatbot to provide information that is the best and comprehensive answer to the user's intended query by identifying conditions, decisions, and independent variables in a first answer generated by the AI chatbot to the query requesting information. Conditions, as used herein, refer to the circumstances or requirements needed to make the answer valid. For example, in the answer, "The return policy is 30 days for most items, provided the product is unused and in original packaging," the conditions correspond to 30 days, unused and original packaging. Decisions, as used herein, refer to the information used to select the most appropriate response to the query. For example, in response to the query "What is the best restaurant near me?", the AI chatbot generates the answer "Based on your location, the top-rated restaurants nearby are [list of options]." In such an answer, the decision is the location of the user, since based on such a location of the user, the top-rated restaurants are generated. Independent variables, as used herein, refer to the main actions, aspects, or headings in an answer that identify the key ideas, steps, or information in the answer. Such variables are not necessarily influenced by other variables in the answer. After identifying such conditions, decisions, and independent variables in the first answer generated by the AI chatbot to the query requesting information, the first answer is presented to the user including one or more of these identified conditions, decisions, and independent variables, which are highlighted in the first answer. Furthermore, such conditions, decisions, and independent variables may be associated with an input edit box, which allows the user to provide input regarding the associated condition, decision, or independent variable. For example, such an input edit box may correspond to a pull-down menu listing various types of bank accounts in connection with the independent variable of the type of account involving an answer describing how to open a new account in a bank. After receiving input from the user via such input edit boxes, a new query (referred to herein as the "recommended query") is generated. For example, the initial query may be "How to create a new account in a bank." The new or recommended query may then be "How to create a new account in bank, where the account type is savings." A new answer (a second answer) is then generated by the AI chatbot based on this new or recommended query. The above-described process is repeated until the number of conditions, decisions, and independent variables identified in the answer is below (i.e., does not exceed) a threshold number, which may be user-designated. In this manner, the AI chatbot is enabled to provide information that is the best and comprehensive answer to the user's intended query. These and other features will be discussed in further detail below.

In some embodiments of the present disclosure, the present disclosure comprises a computer-implemented method, system, and computer program product for generating a more accurate answer by an artificial intelligence chatbot. In one embodiment of the present disclosure, a first answer to a query requesting information is analyzed to extract conditions, decisions, and independent variables from the first answer. The first answer is generated and displayed to the user providing the query, where the first answer includes one or more of the extracted conditions, decisions, and independent variables which are highlighted to indicate to the user to provide feedback regarding such extracted conditions, decisions, and independent variables. After receiving input from the user regarding the highlighted conditions, decisions, and independent variables, a new query (referred to herein as the "recommended query") is generated. A new answer (a second answer) is then generated by the artificial intelligence chatbot based on this new or recommended query. The above-described process is repeated until the number of conditions, decisions, and independent variables identified in the answer is below (i.e., does not exceed) a threshold number, which may be user-designated. In this manner, the artificial intelligence chatbot is enabled to provide information that is the best and comprehensive answer to the user's intended query.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a server 102, such as hosted on a data center, via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance, and the like) configured with the capability of connecting to network 103 and consequently communicating with other computing devices 101 and server 102. It is noted that both computing device 101 and the user of computing device 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 902.11 standards network, various combinations thereof, etc. Other networks, whose descriptions are omitted here for brevity, may also be used in conjunction with system 100 of FIG. 1 without departing from the scope of the present disclosure.

Server 102 may correspond to one of the servers in a data center that hosts an artificial intelligence (AI) chatbot 104. A server, such as server 102, is a computer or system that provides services, data, applications, or resources to end-user devices. A data center is a physical facility that houses and operates computing and networking equipment, such as servers (e.g., server 102) and related infrastructure (e.g., power supplies, cooling systems), used to centrally store, process, and distribute large amounts of data. An AI chatbot 104, as used herein, refers to a software program that uses artificial intelligence to simulate human-like conversations with users. As discussed above, AI chatbots are designed to understand a user's needs, preferences, and intent without the need for a human operator. For example, AI chatbots use natural language processing (NLP) and machine learning (ML) to understand and respond to user queries. They can adapt to user inputs over time and handle a wider range of issues more accurately and efficiently than traditional chatbots.

In one embodiment, users of computing device 101 may issue a query (query requesting information) to AI chatbot 104 hosted on server 102 via network 103. For example, the query issued by the user of computing device 101 may be to summarize the key points of the article entitled "The Impact of AI on the Workplace."

In one embodiment, AI chatbot 104 analyzes the semantics of the query using a large language model (LLM) 105. Analyzing the semantics of the query, as used herein, refers to examining the underlying meaning and context of a question or search phrase to understand the user's intent and the relationships between the concepts mentioned in the query. A large language model 105, as used herein, refers to a type of artificial intelligence that is trained on a massive dataset of text allowing it to understand the query. In embodiments of the present disclosure, server 102 may include multiple types of LLMs 105, such as one incorporated with the domain knowledge (specialized expertise or understanding within a specific field, industry, or discipline) to answer the user's query and one focused on natural language understanding in the context of extracted conditions, decisions, and independent variables and extracted workflows as discussed further below.

In one embodiment, AI chatbot 104 performs a search in a knowledge base, such as knowledge base 106 connected to server 102, for an answer to the query based on the analyzed semantics. A knowledge base, such as knowledge base 106, as used herein, refers to a centralized repository of information that stores data and knowledge related to a specific topic, product, or service. For example, the user of computing device 101 may have provided the query of "How to open a new account in a bank?" Based on analyzing the semantics of the query, AI chatbot 104 searches knowledge base 106 for information pertaining to opening a bank account.

In one embodiment, server 102 is configured to enable AI chatbot 104 to provide information that is the best and comprehensive answer to the user's intended query, such as by extracting conditions, decisions, and independent variables from the first answer generated by AI chatbot 104 to the query, such as a query issued by the user of computing device 101, requesting information. Conditions, as used herein, refer to the circumstances or requirements needed to make the answer valid. For example, in the answer, "The return policy is 30 days for most items, provided the product is unused and in original packaging," the conditions correspond to 30 days, unused and original packaging. Decisions, as used herein, refer to the information used to select the most appropriate response to the query. For example, in response to the query "What is the best restaurant near me?", the AI chatbot generates the answer "Based on your location, the top-rated restaurants nearby are [list of options]." In such an answer, the decision is the location of the user, since based on such a location of the user, the top-rated restaurants are generated. Independent variables, as used herein, refer to the main actions, aspects, or headings in an answer that identify the key ideas, steps, or information in the answer. Such variables are not necessarily influenced by other variables in the answer.

In one embodiment, after extracting such conditions, decisions, and independent variables from the first answer generated by AI chatbot 104 to the query requesting information, server 102 presents the first answer to the user including one or more of these extracted conditions, decisions, and independent variables, which are highlighted in the first answer.

Furthermore, such highlighted conditions, decisions, and independent variables may be associated with an input edit box, which allows the user to provide input regarding the associated condition, decision, or independent variable. For example, such an input edit box may correspond to a pull-down menu listing various types of bank accounts in connection with the independent variable of the type of bank account involving an answer describing how to open a new account in a bank.

In one embodiment, after receiving input from the user via such input edit boxes, server 102 generates a new query (referred to herein as the "recommended query"). For example, the initial query may be "How to create a new account in a bank." The new or recommended query may then be "How to create a new account in a bank, where the type of bank account is a savings account."

In one embodiment, AI chatbot 104 generates a new answer (a second answer) based on this new or recommended query.

The above-described process is repeated until the number of conditions, decisions, and independent variables extracted from the answer is below (i.e., does not exceed) a threshold number, which may be user-designated.

In this manner, the AI chatbot, such as AI chatbot 104, is enabled to provide information that is the best and comprehensive answer to the user's intended query.

A further discussion regarding these and other features is provided below.

A description of the software components of server 102 used for enabling AI chatbot 104 to provide information that is the best and comprehensive answer to the user's intended query is provided below in connection with FIG. 2. A description of the hardware configuration of server 102 is provided further below in connection with FIG. 8.

System 100 is not to be limited in scope to any one particular network architecture. System 100 may include any number of computing devices 101, servers 102, networks 103, AI chatbots 104, large language models 105, and knowledge bases 106.

A discussion regarding the software components used by server 102 for enabling artificial intelligence chatbots (e.g., AI chatbot 104) to provide information that is the best and comprehensive answer to the user's intended query is provided below in connection with FIG. 2

Figure 2:
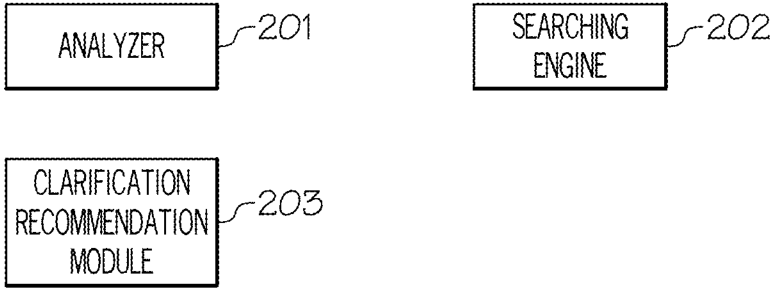
FIG. 2 is a diagram of the software components used by the server for enabling artificial intelligence chatbots to provide information that is the best and comprehensive answer to the user's intended query in accordance with an embodiment of the present disclosure.

FIG. 2 is a diagram of the software components used by server 102 for enabling artificial intelligence chatbots (e.g., AI chatbot 104) to provide information that is the best and comprehensive answer to the user's intended query in accordance with an embodiment of the present disclosure. It is noted that some or all of the components discussed herein in connection with FIG. 2 may be part of AI chatbot 104.

Referring to FIG. 2, in conjunction with FIG. 1, server 102 includes analyzer 201 configured to receive a query, such as a query issued from a user of computing device 101, requesting information.

In one embodiment, users of computing device 101 may issue a query (query requesting information) to AI chatbot 104 hosted on server 102 via network 103. A query, as used herein, refers to a question or request for information that a user, such as a user of computing device 101, types into a user interface, such as a user interface of computing device 101. For example, the query issued by the user of computing device 101 may be to summarize the key points of the article entitled "The Impact of AI on the Workplace."

In one embodiment, analyzer 201 is configured to analyze the semantics of the received query using large language model 105, such as a large language model incorporated with the domain knowledge (specialized expertise or understanding within a specific field, industry, or discipline) of the query. Analyzing the semantics of the query, as used herein, refers to examining the underlying meaning and context of a question or search phrase to understand the user's intent and the relationships between the concepts mentioned in the query. A large language model 105, as used herein, refers to a type of artificial intelligence that is trained on a massive dataset of text allowing it to understand the query.

In one embodiment, analyzer 201 analyzes the semantics of the received query using large language model 105 by converting the query into a numerical vector representation (embedding) which captures the meaning of the words and their relationship within the context. Large language model 105 is then used to interpret this embedding and extract key semantic elements, such as entities, intents, and relationships to allow the model to understand the user's meaning.

In one embodiment, analyzer 201 pre-processes the query by splitting the query into individual words or meaningful units, referred to as tokens.

In one embodiment, analyzer 201 converts the query into embeddings using a pre-trained word embedding model (e.g., Word2V, GloVe) to map each token into a vector representing its semantic meaning. Furthermore, in one embodiment, analyzer 201 aggregates the word embeddings to create a single vector representing the whole query, considering the order and context of words using techniques, such as averaging, weighted averaging, or attention mechanisms.

In one embodiment, semantic analysis with large language model 105 involves intent classification by analyzing the embedding to identify the primary action or goal the user is trying to achieve with the query.

Furthermore, in one embodiment, semantic analysis with large language model 105 involves entity recognition by extracting key entities (e.g., people, places, organizations, dates) mentioned in the query.

Additionally, in one embodiment, semantic analysis with large language model 105 involves relationship extraction by identifying the relationships between entities and their attributes.

Furthermore, in one embodiment, semantic analysis with large language model 105 involves contextual understanding by leveraging large language model's 105 ability to understand broader context and nuances of language to interpret the query's meaning.

In one embodiment, analyzer 201 utilizes various software tools for analyzing the semantics of a query as described above, including, but are not limited to, IBM Watson® Discovery, Google® Cloud NLP, SPARQL, Query Classifiers, etc.

In one embodiment, server 102 further includes searching engine 202 configured to search knowledge base 106 for the answer to the received query based on the analyzed semantics. A knowledge base, such as knowledge base 106, as used herein, refers to a centralized repository of information that stores data and knowledge related to a specific topic, product, or service. For example, the user of computing device 101 may have provided the query of "How to create a new account in a bank?" Based on analyzing the semantics of the query by analyzer 201, searching engine 202 searches knowledge base 106 for information pertaining to opening a bank account.

In one embodiment, searching engine 202 compares the meaning of the semantic representations of the knowledge base entries with the semantic representation of the received query. For example, in one embodiment, the analyzed semantics of the received query may be represented as a vector as discussed above. Furthermore, in one embodiment, the knowledge base entries are represented as vectors. For example, in one embodiment, each piece of information in the knowledge base is converted into a vector representation, such as via the word embedding technique. As a result, a numerical comparison of semantic similarity may be performed between the query and the knowledge base entries.

In one embodiment, searching engine 202 performs such a numerical comparison by performing a vector similarity search, which compares the query vector to the vectors of each knowledge base entry to identify the most semantically similar ones. In one embodiment, such results may be ranked based on relevance, such as the distance between the vectors, the context of the knowledge base entry, and any additional semantic information to refine the ranking of potential answers.

In one embodiment, searching engine 202 identifies the knowledge base entry that best matches the semantic meaning of the query as corresponding to the answer to the query.

In one embodiment, searching engine 202 searches knowledge base 106 for the answer to the query based on the analyzed semantics using various software tools, which can include, but are not limited to, IBM Watson® Discovery, Bloomfire®, etc.

Referring again to analyzer 201, in one embodiment, analyzer 201 is further configured to analyze the answer to extract the conditions, decisions, and independent variables from the answer to generate a list of conditions, decisions, and independent variables. Conditions, as used herein, refer to the circumstances or requirements needed to make the answer valid. For example, in the answer, "The return policy is 30 days for most items, provided the product is unused and in original packaging," the conditions correspond to 30 days, unused and original packaging. Decisions, as used herein, refer to the information used to select the most appropriate response to the query. For example, in response to the query "What is the best restaurant near me?", the AI chatbot generates the answer "Based on your location, the top-rated restaurants nearby are [list of options]." In such an answer, the decision is the location of the user, since based on such a location of the user, the top-rated restaurants are generated. Independent variables, as used herein, refer to the main actions, aspects, or headings in an answer that identify the key ideas, steps, or information in the answer. Such variables are not necessarily influenced by other variables in the answer.

In one embodiment, analyzer 201 analyzes the answer to extract the conditions, decisions, and independent variables from the answer to generate a list of conditions, decisions, and independent variables using a large language module 105 that is focused on natural language understanding in the context of extracted conditions, decisions, and independent variables. In one embodiment, analyzer 201 analyzes the answer to extract the conditions, decisions, and independent variables from the answer to generate a list of conditions, decisions, and independent variables using such a large language module 105 by using natural language processing (NLP) techniques to parse the text, extract key phrases, and identify patterns related to conditional statements ("if-then" logic), decision points ("choose this option"), and factors that influence the outcome (independent variables) based on the context of the conversation and the AI chatbot's reasoning process.

In one embodiment, analyzer 201 analyzes the answer to extract the conditions, decisions, and independent variables from the answer to generate a list of conditions, decisions, and independent variables by first breaking down the text into individual words or meaningful units ("tokens") to facilitate the analysis. Furthermore, in one embodiment, analyzer 201 then performs part-of-speech tagging, which includes identifying the grammatical role of each word (noun, verb, adjective) to understand the sentence structure.

In one embodiment, following tokenization and part-of-speech tagging, analyzer 201 performs named entity recognition, which involves recognizing and classifying named entities, such as people, places, organizations, and dates within the text.

Furthermore, in one embodiment, analyzer 201 then performs dependency parsing and keyword extraction followed by semantic analysis. Dependency parsing involves analyzing the grammatical relationships between words in a sentence to understand the logical flow of the answer. Keyword extraction involves identifying key phrases or terms that indicate conditions, decisions, or independent variables based on predefined patterns or trained models. Semantic analysis involves understanding the meaning of words and phrases within the context of the query to identify potential conditions and outcomes.

In one embodiment, analyzer 201 identifies specific elements, such as conditions, decisions, and independent variables. For example, in one embodiment, analyzer 201 searches for phrases, such as "if," "when," "unless," and "provided that," which signal conditional statements. In one embodiment, analyzer 201 searches for phrases, such as "choose," "select," "decide," "option," and "consider," which indicate decision points. In one embodiment, analyzer 201 identifies nouns or phrases that are explicitly mentioned as factors affecting the outcome, such as describing the reasoning behind a decision.

Figures 3A, 3B:
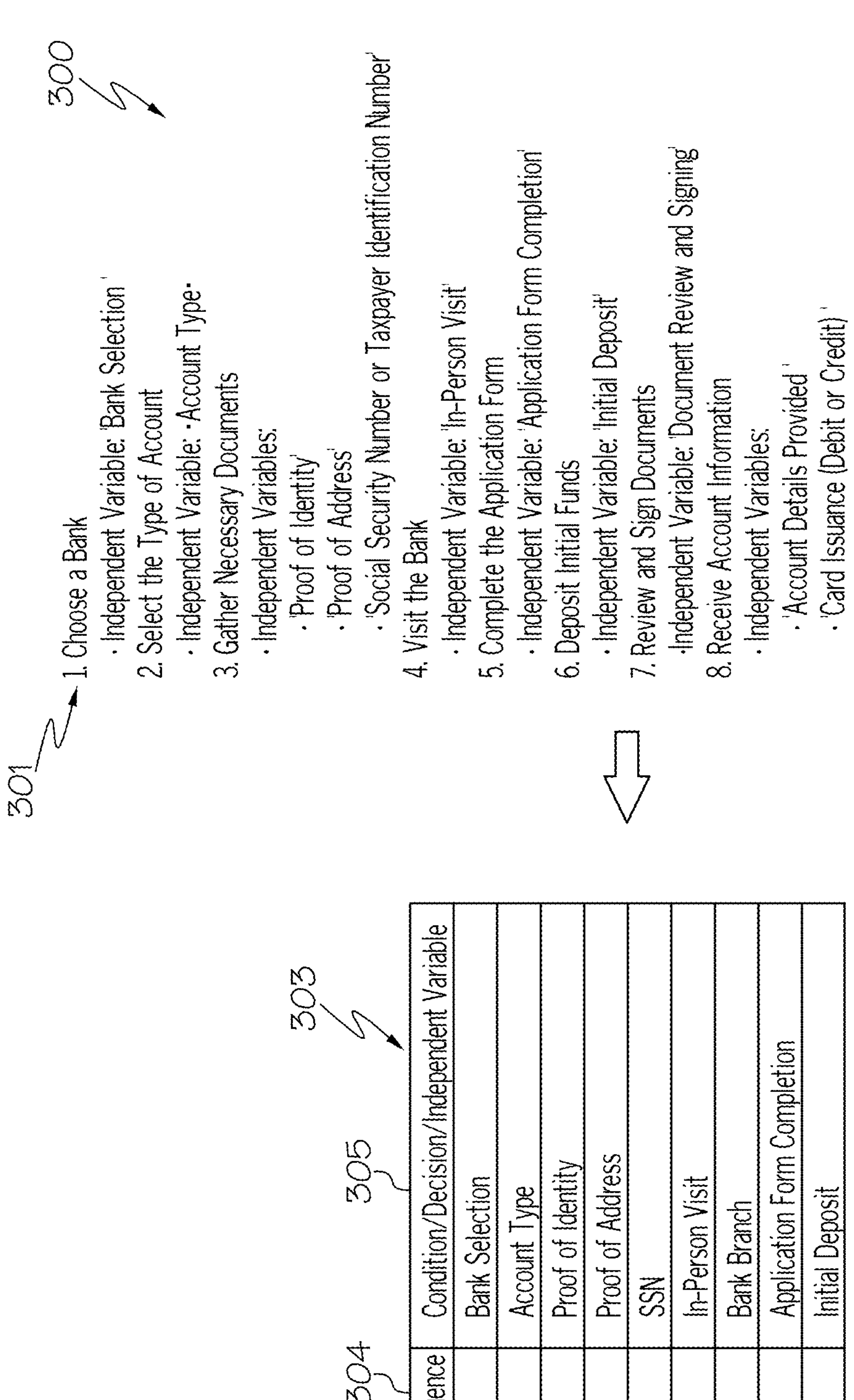
FIG. 3A illustrates an extraction of the conditions, decisions, and independent variables from the answer in accordance with an embodiment of the present disclosure.
FIG. 3B illustrates a sequential listing of the conditions, decisions, and independent variables extracted from the answer in accordance with an embodiment of the present disclosure.

An example of extracting conditions, decisions, and independent variables from the answer to generate a list of conditions, decisions, and independent variables is provided in connection with FIGS. 3A-3B.

Referring to FIG. 3A, FIG. 3A illustrates an extraction of the conditions, decisions, and independent variables from the answer in accordance with an embodiment of the present disclosure.

As shown in FIG. 3A, such an extraction 300, which may be performed, at least in part, with the assistance of a large language model 105, includes a list 301 of conditions, decisions, and independent variables extracted from the answer as shown by numbers 1-10 (see element 301). For example, in the answer to the query ("How to open a new account in a bank?"), analyzer 201 generates a list 301 of conditions, decisions, and independent variables extracted from the answer using a large language module 105 that is focused on natural language understanding in the context of extracted conditions, decisions, and independent variables. In such an example, list 301 includes the conditions, decisions, and independent variables of: selecting the bank, selecting account type, gathering necessary documents, visiting the bank, completing the application form, depositing initial funds, reviewing and signing documents, receiving account information, activating online banking (if applicable), and keeping records.

In one embodiment, such a list 301 of conditions, decisions, and independent variables extracted from the answer may be formatted in a sequential listing of the conditions, decisions, and independent variables extracted from the answer as shown in FIG. 3B.

FIG. 3B illustrates a sequential listing 303 of the conditions, decisions, and independent variables extracted from the answer in accordance with an embodiment of the present disclosure.

Referring to FIG. 3B, such a sequential listing 303 includes a listing of the sequence 304 of the condition/decision/independent variable 305 in the order presented in the answer to the query requesting information. As illustrated in FIG. 3B, such a sequence 304 may include multiple sub-parts, which are designated as ".1, ".2," etc.

Returning to FIG. 2, in conjunction with FIGS. 3A-3B, analyzer 201 utilizes various software tools for analyzing the answer to extract the conditions, decisions, and independent variables from the answer to generate a list of conditions, decisions, and independent variables as discussed above, including, but are not limited to, Botium, QBox®, BotMetrics, Dashbot®, Tidio®, etc.

In one embodiment, server 102 further includes clarification recommendation module 203 configured to determine whether or not the answer to the query needs clarification.

In one embodiment, such a determination is performed by determining if the number of extracted conditions, decisions, and independent variables from the generated list of conditions, decisions, and independent variables exceeds a threshold value, which may be user-designated.

If the number of extracted conditions, decisions, and independent variables does not exceed the threshold value, then clarification recommendation module 203 displays the answer to the user, such as the user of computing device 101 which issued the query requesting information, without any clarifications (such as inserting input edit boxes to enable the user to provide input regarding the associated condition, decision, or independent variable as discussed further below). In one embodiment, clarification recommendation module 203 displays the answer to the user on the display of computing device 101.

If, however, the number of extracted conditions, decisions, and independent variables exceeds the threshold value, then, in one embodiment, clarification recommendation module 203 extracts the workflow from the answer to generate a tree view of the workflow. A "workflow," as used herein, refers to a define sequence of steps or tasks that need to be completed as discussed in the answer to the received query. A "tree view of the workflow," as used herein, refers to a visual representation of the process of the workflow, where each step in the workflow is displayed as a node in a hierarchical structure.

In one embodiment, clarification recommendation module 203 extracts the workflow from the answer to generate a tree view of the workflow using a large language module 105 that is focused on extracted workflows by identifying the key decision points and sequence steps within the answer and then visually represents them as nodes and connections on a tree diagram. In one embodiment, each node represents an action or question, and the branches show the potential paths based on user input or conditions.

In one embodiment, clarification recommendation module 203 extracts the workflow from the answer to generate a tree view of the workflow by performing text analysis, structure building, and visual representation.

In one embodiment, clarification recommendation module 203 performs text analysis by identifying keywords in the answer, such as looking for words and phrases that indicate decision points, such as "if," "else," "depending on," "choose from," etc. Furthermore, in one embodiment, clarification recommendation module 203 performs text analysis by extracting actions from the answer, such as identifying verbs and noun phrases that describe specific actions or information requests. Additionally, in one embodiment, clarification recommendation module 203 performs text analysis by recognizing conditional logic in the answer, such as identifying key phrases that suggest different paths based on user input, such as "if the user says yes, then . . . "

In one embodiment, clarification recommendation module 203 performs structure building by constructing the root node of the tree view of the workflow as corresponding to the initial prompt or greeting in the answer. Furthermore, clarification recommendation module 203 performs structure building by constructing the child nodes branching out from the parent node to correspond to each action or question identified in the text of the answer. Additionally, clarification recommendation module 203 performs structure building by creating multiple branches from a node where conditions are present, where each branch represents a potential path, such as based on the user's response.

In one embodiment, clarification recommendation module 203 performs visual representation by visually creating the tree structure, such as via a diagramming tool or software. Furthermore, clarification recommendation module 203 performs visual representation by labeling each node with the corresponding action or question from the answer. Additionally, clarification recommendation module 203 performs visual representation by connecting nodes with lines to show the sequence of steps and potential branching paths.

An example of extracting a workflow from the answer to generate a tree view of the workflow is provided in connection with FIG. 4.

FIG. 4 illustrates a tree view 400 of the workflow that was extracted from the answer to the query requesting information in accordance with an embodiment of the present disclosure.

Referring to FIG. 4, FIG. 4 illustrates a tree view 400 of the workflow that was extracted from the answer to the query ("How to open a new account in a bank?"). In one embodiment, such a tree view 400 includes the hierarchical listing, such as list 301 of extraction 300 of FIG. 3A.

Returning to FIG. 2, in conjunction with FIGS. 3A-3B and 4, in one embodiment, clarification recommendation module 203 utilizes various software tools for extracting the workflow from the answer to generate a tree view of the workflow including, but are not limited to, Lucidchart®, Miro®, ClickUp®, Microsoft® Power Automate, etc.

In one embodiment, clarification recommendation module 203 is configured to generate and display the answer including a presentation of one or more of the conditions, decisions, and independent variables from the list of conditions, decisions, and independent variables that are highlighted based on the tree view of the workflow. In one embodiment, such highlighting involves visually indicating that additional information is required regarding such conditions, decisions, and independent variables in order to improve the answer to the user's intended query.

In one embodiment, clarification recommendation module 203 presents only a top user-designated number of conditions, decisions, and independent variables from the list of conditions, decisions, and independent variables that are highlighted based on the tree view of the workflow as discussed further below.

In one embodiment, clarification recommendation module 203 applies a natural language processing algorithm to semantically match the conditions, decisions, and independent variables to the text of the answer for every node in tree view 400. That is, clarification recommendation module 203 uses natural language processing techniques to analyze the answer to the query at every decision point within the conversational flow to identify key elements, such as conditions, decisions, and independent variables, and comparing them to the original text to determine if they align in meaning.

In one embodiment, such an algorithm is a combination of performing n-gram token comparison, Word2Vec embedding, and the cosine similarity calculation to perform a comprehensive text similarity analysis. In one embodiment, the n-gram token comparison breaks the text of the answer into sequences of n words (n-grams), capturing local word patterns and providing a basic understanding of word proximity within a sentence. Word2Vec embedding involves converting each word in the n-grams into a vector representation using the Word2Vec model, which captures semantic meaning and relationships between words beyond their presence in the text. The cosine similarity calculation involves comparing the similarity between two text segments by calculating the cosine similarity between the respective Word2Vec vectors.

In one embodiment, clarification recommendation module 203 records the position of every condition, decision, and independent variable that occurs in the answer to the query.

In one embodiment, clarification recommendation module 203 records every occurrence of the condition, decision, and independent variable in tree view 400, such as in the format of "1.1.1," which indicates the depth and branch of tree view 400.

In one embodiment, clarification recommendation module 203 scores the importance of the condition, decision, and independent variable, where the top N conditions, decisions, and independent variables, where N is user-designated, is selected to be presented and highlighted in the answer for the user to provide feedback as discussed further below.

In one embodiment, clarification recommendation module 203 generates such a score based on the position of the condition, decision, and independent variable in tree view 400, such as the position that it is first recited in tree view 400 (referred to herein as the "first start position in response text"), and based on the length of the text of the answer (i.e., the length of the response text). Furthermore, such a position may be weighted (referred to herein as $\text{Weight}_{early}$), which may be user-designated. Additionally, in one embodiment, such a score may be based on the depth of the occurrence of the condition, decision, and independent variable in tree view 400 and based on the depth of the tree. Furthermore, such a depth of the occurrence of the condition, decision, and independent variable may be weighted (referred to herein as $\text{Weight}_{highlevel}$), which may be user-designated. Furthermore, if the condition, decision, and independent variable corresponds to a branch condition, then an add-on score (referred to herein as "adjust according to branch condition") may be added to the score thereby making the score of that branch condition higher and the score of the later condition, decision, and independent variable lower. For instance, in one embodiment, the score=(1−position in answer/length of response text)*$\text{Weight}_{early}$+(1−min(depth of occurrence in tree view)/depth of tree)*$\text{Weight}_{highlevel}$+ adjust according to branch condition.

In one embodiment, clarification recommendation module 203 highlights the top N, which may be user-designated, conditions, decisions, and independent variables to be presented in the answer for the user to provide feedback.

Figure 6:
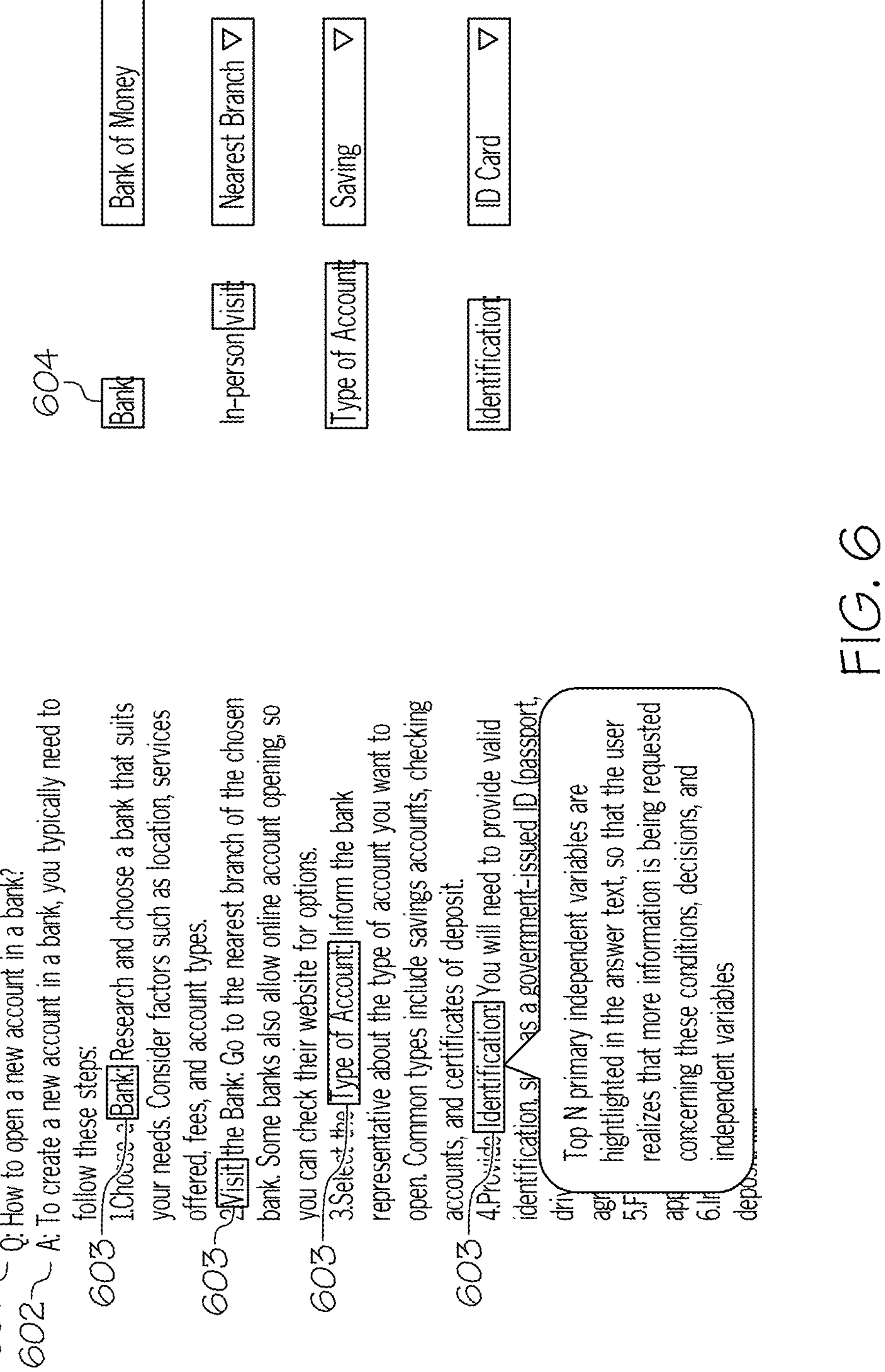
FIG. 6 illustrates displaying an answer to a query including a presentation of highlighted conditions, decisions, and independent variables for which the user is requested to provide feedback in accordance with an embodiment of the present disclosure.

Additionally, in one embodiment, clarification recommendation module 203 generates input edit boxes associated with such highlighted conditions, decisions, and independent variables, which enable the user to provide input regarding the associated conditions, decisions, and independent variables as illustrated in FIGS. 5 and 6.

FIG. 5 illustrates the scoring of the extracted conditions, decisions, and independent variables in accordance with an embodiment of the present disclosure.

Referring to FIG. 5, in conjunction with FIGS. 3B and 4, such a scoring may be generated in a data structure, such as table 500, which includes columns 304, 305, 501, 502, 503, 504 and 505.

Column 304 corresponds to the step in the order of steps presented in the answer to the query requesting information as discussed above. Column 305 corresponds to the condition, decision, or independent variable in question. Column 501 corresponds to the position in tree view 400 that the corresponding condition, decision, or independent variable first appeared. Column 502 corresponds to the node in tree view 400 that the condition, decision, or independent variable first appeared. Column 503 corresponds to the possible values for such conditions, decisions, and independent variables. For example, an account type could be a savings account or a checking account. Such possible values may be presented to the user via an input edit box to order to obtain further information from the user so that the answer to the user's query can be improved in order to provide the best and comprehensive answer to the user's intended query. Column 504 contains information as to whether the corresponding condition, decision, and independent variable corresponds to a branch condition. Column 505 lists the computed score.

In one embodiment, the top N, which may be user-designated, conditions, decisions, and independent variables from the list of conditions, decisions, and independent variables, may be presented and highlighted to the user for feedback as illustrated in FIG. 6.

FIG. 6 illustrates displaying an answer to a query including a presentation of highlighted conditions, decisions, and independent variables for which the user is requested to provide feedback in accordance with an embodiment of the present disclosure.

As shown in FIG. 6, the query (Q) 601 requesting information is received by analyzer 201, where the semantics of the query are analyzed. In one embodiment, searching engine 202 searches knowledge base 106 for the answer (A) 602 to the query based on the analyzed semantics of the query.

In one embodiment, such an answer 602 includes highlighted 603 conditions, decisions, and independent variables that are presented to the user to provide feedback. Such conditions, decisions, and independent variables are highlighted to indicate to the user that more information is being requested concerning these conditions, decisions, and independent variables.

Furthermore, in one embodiment, clarification recommendation module 203 generates input edit boxes 604 associated with such highlighted conditions, decisions, and independent variables. In one embodiment, such input edit boxes 604 correspond to pull-down menus which allow the user to select a value (e.g., which type of bank account) out of a listing of values (e.g., savings account, checking account).

In one embodiment, upon receiving input from the user regarding one or more of the highlighted conditions, decisions, and independent variables, clarification recommendation module 203 generates a recommended query based on the received input.

For example, if the user provided feedback that indicated that the bank was the "Bank of Money," the type of account was a "savings account," and the identification used was an "ID card," then the query may be reformulated to correspond to "How to create a new account in a bank given that the bank is the Bank of Money, the account is a savings account, and the identification is an ID card?"

Based on the recommended query, the semantics of such a revised query is analyzed by analyzer 201 and the above-described process continues. For example, searching engine 202 searches knowledge base 106 for a second answer to the revised query based on the analyzed semantics of the revised query. The second answer is then analyzed to extract the conditions, decisions, and independent variables from the second answer to generate a list of conditions, decisions, and independent variables. If the number of conditions, decisions, and independent variables extracted from the second answer is below (i.e., does not exceed) a threshold number, which may be user-designated, then the process is completed and the second answer is presented to the user as a final answer without any feedback requests, such as via input edit boxes. If, however, the number of conditions, decisions, and independent variables extracted from the second answer is still not below the threshold number, then the process continues as described above resulting in the second answer being presented to the user including highlighted conditions, decisions, and independent variables for which the user is requested to provide feedback as illustrated in FIG. 7.

Figure 7:
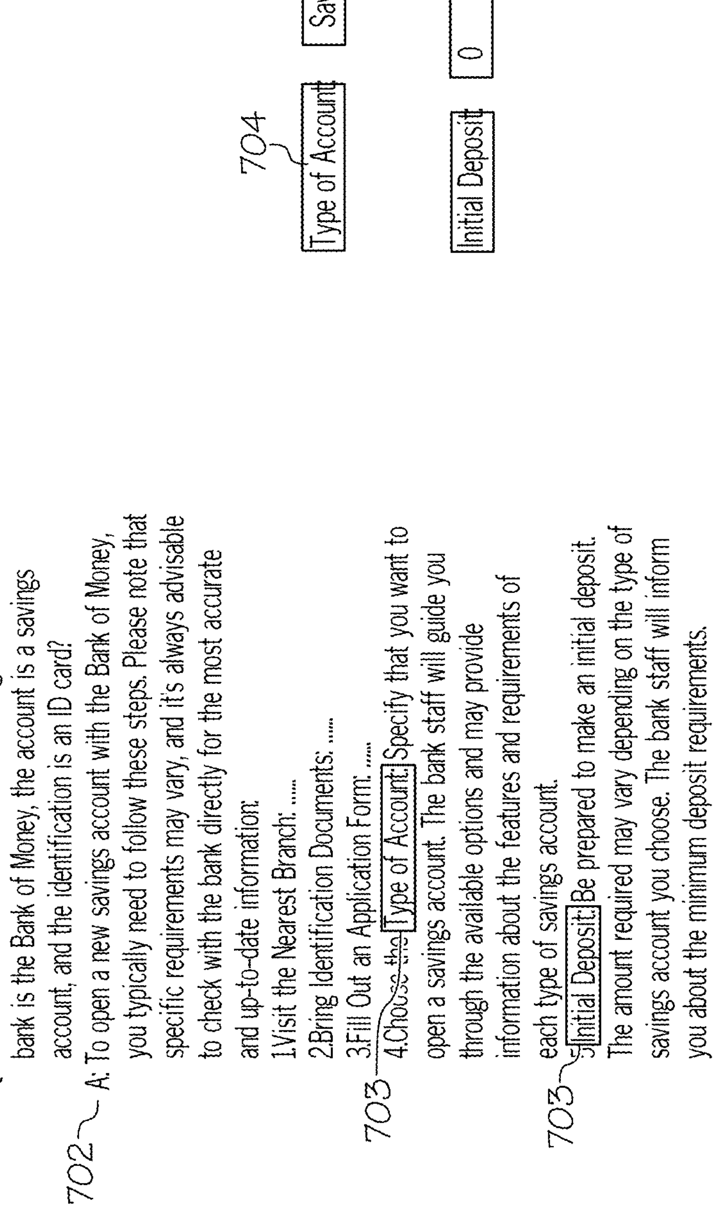
FIG. 7 illustrates displaying a subsequent answer to a revised query including a presentation of highlighted conditions, decisions, and independent variables for which the user is requested to provide further feedback in accordance with an embodiment of the present disclosure.

FIG. 7 illustrates displaying a subsequent answer to a revised query including a presentation of highlighted conditions, decisions, and independent variables for which the user is requested to provide further feedback in accordance with an embodiment of the present disclosure.

As shown in FIG. 7, the revised query (Q) 701 (e.g., How to create a new account in a bank given that the bank is the Bank of Money, the account is a savings account, and the identification is an ID card?) requesting information is received by analyzer 201, where the semantics of the query are analyzed. In one embodiment, searching engine 202 searches knowledge base 106 for the answer (A) 702 to the revised query based on the analyzed semantics of the query.

In one embodiment, such an answer 702 includes highlighted 703 conditions, decisions, and independent variables (e.g., type of savings account, initial deposit) that are presented to the user to provide feedback. Such conditions, decisions, and independent variables are highlighted to indicate to the user that more information is being requested concerning these conditions, decisions, and independent variables.

Furthermore, in one embodiment, clarification recommendation module 203 generates input edit boxes 704 associated with such highlighted conditions, decisions, and independent variables. In one embodiment, such input edit boxes 704 correspond to pull-down menus which allow the user to select a value (e.g., the value of initial deposit) out of a listing of values (e.g., 0, $100, $200).

In one embodiment, upon receiving input from the user regarding one or more of the highlighted conditions, decisions, and independent variables, clarification recommendation module 203 generates a further recommended query based on the received input and the above-described process is repeated.

In this manner, the AI chatbot is enabled to provide information that is the best and comprehensive answer to the user's intended query.

A further description of these and other features is provided below in connection with the discussion of the method for enabling artificial intelligence chatbots (e.g., AI chatbot 104) to provide information that is the best and comprehensive answer to the user's intended query.

Prior to the discussion of the method for enabling artificial intelligence chatbots (e.g., AI chatbot 104) to provide information that is the best and comprehensive answer to the user's intended query, a description of the hardware configuration of server 102 (FIG. 1) is provided below in connection with FIG. 8.

Figure 8:
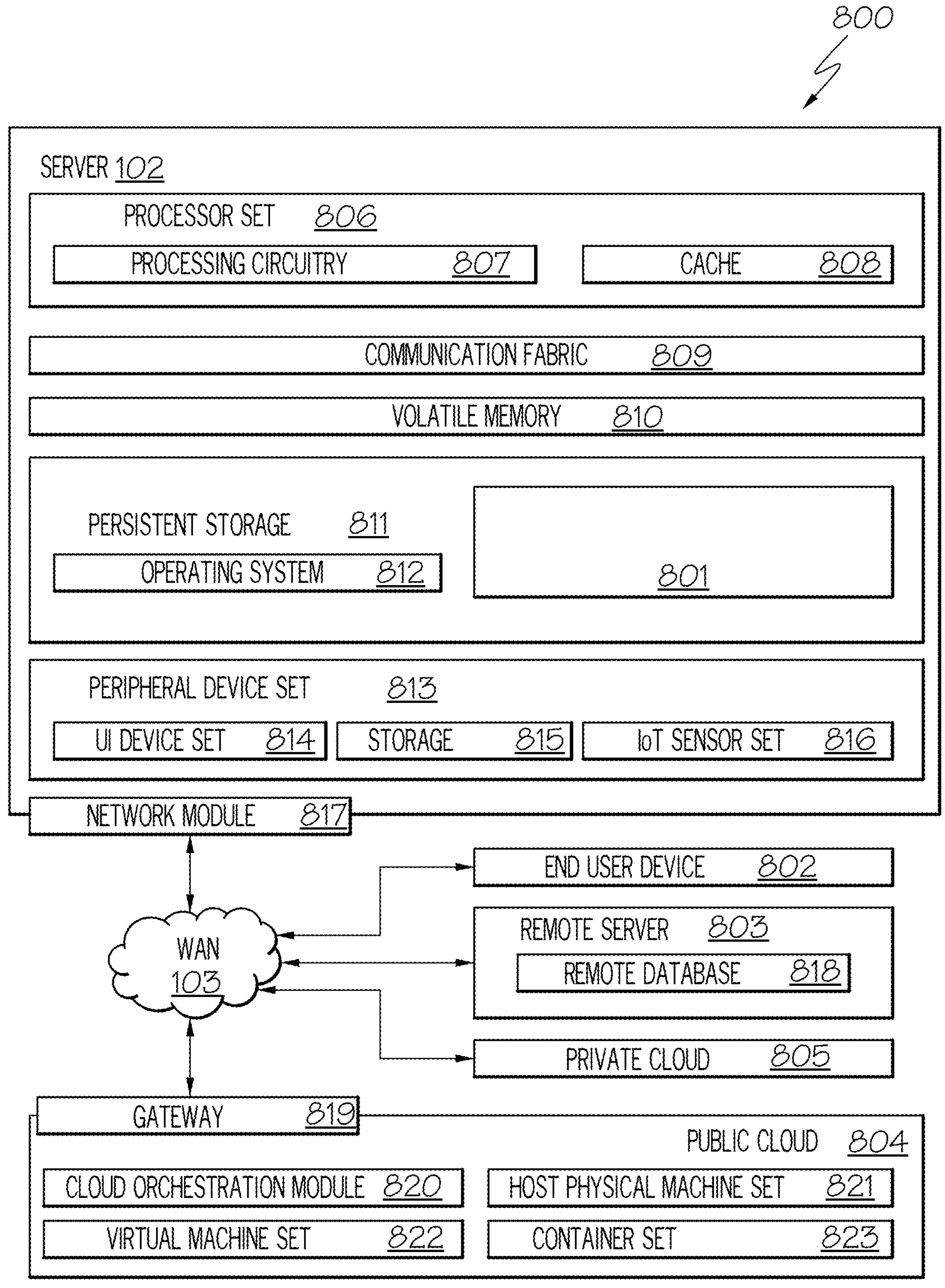
FIG. 8 illustrates an embodiment of the present disclosure of the hardware configuration of the server which is representative of a hardware environment for practicing the present disclosure.

Referring now to FIG. 8, in conjunction with FIG. 1, FIG. 8 illustrates an embodiment of the present disclosure of the hardware configuration of server 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code (stored in block 801) involved in performing the inventive methods, such as enabling artificial intelligence chatbots (e.g., AI chatbot 104) to provide information that is the best and comprehensive answer to the user's intended query. In addition to block 801, computing environment 800 includes, for example, server 102, network 103, such as a wide area network (WAN), end user device (EUD) 802, remote server 803, public cloud 804, and private cloud 805. In this embodiment, server 102 includes processor set 806 (including processing circuitry 807 and cache 808), communication fabric 809, volatile memory 810, persistent storage 811 (including operating system 812 and block 801, as identified above), peripheral device set 813 (including user interface (UI) device set 814, storage 815, and Internet of Things (IoT) sensor set 816), and network module 817. Remote server 803 includes remote database 818. Public cloud 804 includes gateway 819, cloud orchestration module 820, host physical machine set 821, virtual machine set 822, and container set 823.

Server 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 818. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically server 102, to keep the presentation as simple as possible. Server 102 may be located in a cloud, even though it is not shown in a cloud in FIG. 8. On the other hand, server 102 is not required to be in a cloud except to any extent as may be affirmatively indicated.

Processor set 806 includes one, or more, computer processors of any type now known or to be developed in the future. Processing circuitry 807 may be distributed over multiple packages, for example, multiple, coordinated integrated circuit chips. Processing circuitry 807 may implement multiple processor threads and/or multiple processor cores. Cache 808 is memory that is located in the processor chip package(s) and is typically used for data or code that should be available for rapid access by the threads or cores running on processor set 806. Cache memories are typically organized into multiple levels depending upon relative proximity to the processing circuitry. Alternatively, some, or all, of the cache for the processor set may be located "off chip." In some computing environments, processor set 806 may be designed for working with qubits and performing quantum computing.

Computer readable program instructions are typically loaded onto server 102 to cause a series of operational steps to be performed by processor set 806 of server 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 808 and the other storage media discussed below. The program instructions, and associated data, are accessed by processor set 806 to control and direct performance of the inventive methods. In computing environment 800, at least some of the instructions for performing the inventive methods may be stored in block 801 in persistent storage 811.

Communication fabric 809 is the signal conduction paths that allow the various components of server 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 810 is any type of volatile memory now known or to be developed in the future. Examples include dynamic type random access memory (RAM) or static type RAM. Typically, the volatile memory is characterized by random access, but this is not required unless affirmatively indicated. In server 102, the volatile memory 810 is located in a single package and is internal to server 102, but, alternatively or additionally, the volatile memory may be distributed over multiple packages and/or located externally with respect to server 102.

Persistent Storage 811 is any form of non-volatile storage for computers that is now known or to be developed in the future. The non-volatility of this storage means that the stored data is maintained regardless of whether power is being supplied to server 102 and/or directly to persistent storage 811. Persistent storage 811 may be a read only memory (ROM), but typically at least a portion of the persistent storage allows writing of data, deletion of data and re-writing of data. Some familiar forms of persistent storage include magnetic disks and solid state storage devices. Operating system 812 may take several forms, such as various known proprietary operating systems or open source Portable Operating System Interface type operating systems that employ a kernel. The code included in block 801 typically includes at least some of the computer code involved in performing the inventive methods.

Peripheral device set 813 includes the set of peripheral devices of server 102. Data communication connections between the peripheral devices and the other components of server 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 814 may include components such as a display screen, speaker, microphone, wearable devices (such as goggles and smart watches), keyboard, mouse, printer, touchpad, game controllers, and haptic devices. Storage 815 is external storage, such as an external hard drive, or insertable storage, such as an SD card. Storage 815 may be persistent and/or volatile. In some embodiments, storage 815 may take the form of a quantum computing storage device for storing data in the form of qubits. In embodiments where server 102 is required to have a large amount of storage (for example, where server 102 locally stores and manages a large database) then this storage may be provided by peripheral storage devices designed for storing very large amounts of data, such as a storage area network (SAN) that is shared by multiple, geographically distributed computers. IoT sensor set 816 is made up of sensors that can be used in Internet of Things applications. For example, one sensor may be a thermometer and another sensor may be a motion detector.

Network module 817 is the collection of computer software, hardware, and firmware that allows server 102 to communicate with other computers through WAN 103. Network module 817 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 817 are performed on the same physical hardware device. In other embodiments (for example, embodiments that utilize software-defined networking (SDN)), the control functions and the forwarding functions of network module 817 are performed on physically separate devices, such that the control functions manage several different network hardware devices. Computer readable program instructions for performing the inventive methods can typically be downloaded to server 102 from an external computer or external storage device through a network adapter card or network interface included in network module 817.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 802 is any computer system that is used and controlled by an end user (for example, a customer of an enterprise that operates server 102), and may take any of the forms discussed above in connection with server 102. EUD 802 typically receives helpful and useful data from the operations of server 102. For example, in a hypothetical case where server 102 is designed to provide a recommendation to an end user, this recommendation would typically be communicated from network module 817 of server 102 through WAN 103 to EUD 802. In this way, EUD 802 can display, or otherwise present, the recommendation to an end user. In some embodiments, EUD 802 may be a client device, such as thin client, heavy client, mainframe computer, desktop computer and so on.

Remote server 803 is any computer system that serves at least some data and/or functionality to server 102. Remote server 803 may be controlled and used by the same entity that operates server 102. Remote server 803 represents the machine(s) that collect and store helpful and useful data for use by other computers, such as server 102. For example, in a hypothetical case where server 102 is designed and programmed to provide a recommendation based on historical data, then this historical data may be provided to server 102 from remote database 818 of remote server 803.

Public cloud 804 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 804 is performed by the computer hardware and/or software of cloud orchestration module 820. The computing resources provided by public cloud 804 are typically implemented by virtual computing environments that run on various computers making up the computers of host physical machine set 821, which is the universe of physical computers in and/or available to public cloud 804. The virtual computing environments (VCEs) typically take the form of virtual machines from virtual machine set 822 and/or containers from container set 823. It is understood that these VCEs may be stored as images and may be transferred among and between the various physical machine hosts, either as images or after instantiation of the VCE. Cloud orchestration module 820 manages the transfer and storage of images, deploys new instantiations of VCEs and manages active instantiations of VCE deployments. Gateway 819 is the collection of computer software, hardware, and firmware that allows public cloud 804 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 805 is similar to public cloud 804, except that the computing resources are only available for use by a single enterprise. While private cloud 805 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 804 and private cloud 805 are both part of a larger hybrid cloud.

Block 801 further includes the software components discussed above in connection with FIGS. 2, 3A-3B and 4-7 to enable artificial intelligence chatbots (e.g., AI chatbot 104) to provide information that is the best and comprehensive answer to the user's intended query. In one embodiment, such components may be implemented in hardware. The functions discussed above performed by such components are not generic computer functions. As a result, server 102 is a particular machine that is the result of implementing specific, non-generic computer functions.

In one embodiment, the functionality of such software components of server 102, including the functionality for enabling artificial intelligence chatbots (e.g., AI chatbot 104) to provide information that is the best and comprehensive answer to the user's intended query, may be embodied in an application specific integrated circuit.

As stated above, AI chatbots are designed to understand a user's needs, preferences, and intent without the need for a human operator. For example, AI chatbots use natural language processing (NLP) and machine learning (ML) to understand and respond to user queries. They can adapt to user inputs over time and handle a wider range of issues more accurately and efficiently than traditional chatbots. AI chatbots are used in a variety of applications, including customer service. For example, AI chatbots are used for answering frequently asked questions, providing product recommendations, and facilitating transactions. AI chatbots are also used in e-commerce (e.g., providing personalized recommendations), healthcare (e.g., performing patient intake and appointment scheduling), market research (e.g., collecting survey responses), education (e.g., helping students with their homework), etc. Unfortunately, such AI chatbots, such as OpenAI's ChatGPT®, may sometimes provide information that is not the best and comprehensive answer to the user's intended query. In certain situations, the AI chatbot does not provide the best and comprehensive answer to the user's query because the user did not formulate the query properly in order to correctly ask the intended question. While attempts have been made to rephrase queries to the AI chatbot to better align with the user's intended meaning, such as providing additional context, such techniques are deficient in enabling the AI chatbot to provide information that is the best and comprehensive answer to the user's intended query.

The embodiments of the present disclosure provide a means for enabling the AI chatbot to provide information that is the best and comprehensive answer to the user's intended query as discussed below in connection with FIGS. 9A-9B.

Figure 9A:
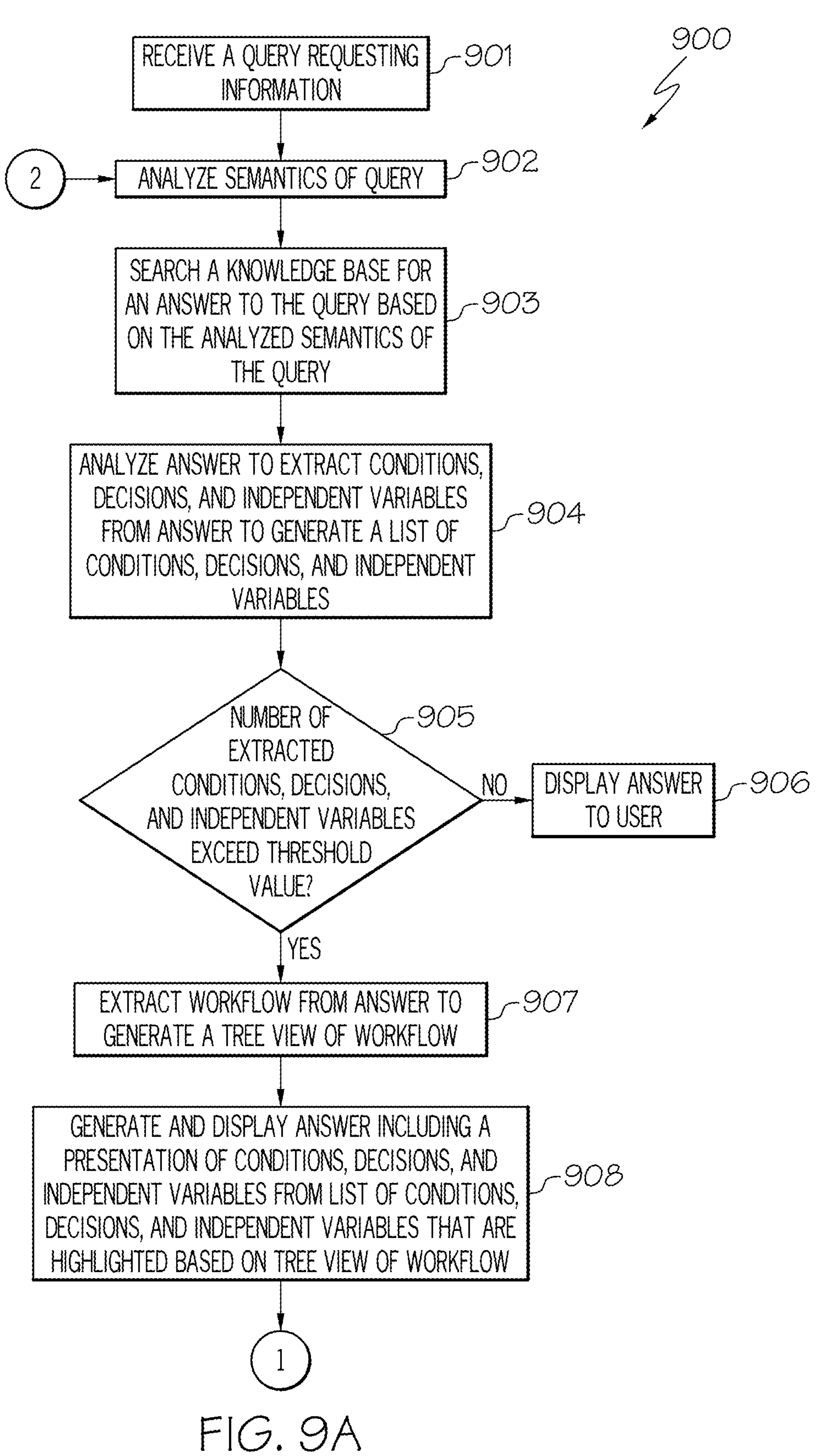
FIGS. 9A-9B are a flowchart of a method for enabling the artificial intelligence chatbot to provide information that is the best and comprehensive answer to the user's intended query in accordance with an embodiment of the present disclosure.
Figure 9B:
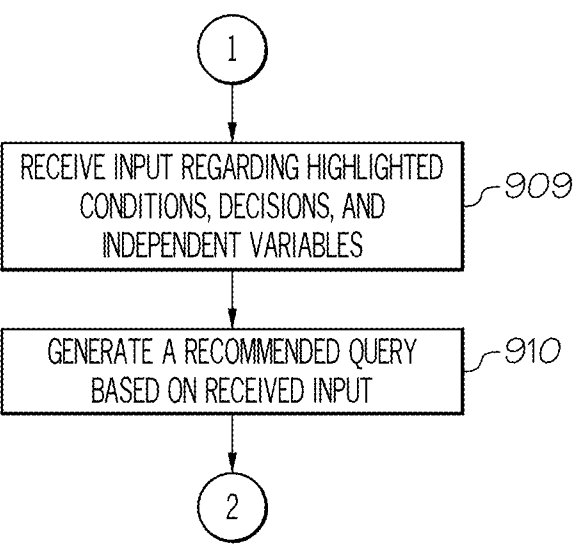

FIGS. 9A-9B are a flowchart of a method 900 for enabling the artificial intelligence chatbot (e.g., AI chatbot 104) to provide information that is the best and comprehensive answer to the user's intended query in accordance with an embodiment of the present disclosure.

Referring to FIG. 9A, in conjunction with FIGS. 1-2, 3A-3B and 4-8, in step 901, analyzer 201 of server 102 receives a query requesting information.

In one embodiment, users of computing device 101 may issue a query (query requesting information) to analyzer 201 of AI chatbot 104 hosted on server 102 via network 103. A query, as used herein, refers to a question or request for information that a user, such as a user of computing device 101, types into a user interface, such as a user interface of computing device 101. For example, the query issued by the user of computing device 101 may be to summarize the key points of the article entitled "The Impact of AI on the Workplace."

In step 902, analyzer 201 of server 102 analyzes the semantics of the received query using large language model 105, such as a large language model incorporated with the domain knowledge (specialized expertise or understanding within a specific field, industry, or discipline) of the query.

As discussed above, analyzing the semantics of the query, as used herein, refers to examining the underlying meaning and context of a question or search phrase to understand the user's intent and the relationships between the concepts mentioned in the query. A large language model 105, as used herein, refers to a type of artificial intelligence that is trained on a massive dataset of text allowing it to understand the query.

In one embodiment, analyzer 201 analyzes the semantics of the received query using large language model 105 by converting the query into a numerical vector representation (embedding) which captures the meaning of the words and their relationship within the context. Large language model 105 is then used to interpret this embedding and extract key semantic elements, such as entities, intents, and relationships to allow the model to understand the user's meaning.

In one embodiment, analyzer 201 pre-processes the query by splitting the query into individual words or meaningful units, referred to as tokens.

In one embodiment, analyzer 201 converts the query into embeddings using a pre-trained word embedding model (e.g., Word2V, GloVe) to map each token into a vector representing its semantic meaning. Furthermore, in one embodiment, analyzer 201 aggregates the word embeddings to create a single vector representing the whole query, considering the order and context of words using techniques, such as averaging, weighted averaging, or attention mechanisms.

In one embodiment, semantic analysis with large language model 105 involves intent classification by analyzing the embedding to identify the primary action or goal the user is trying to achieve with the query.

Furthermore, in one embodiment, semantic analysis with large language model 105 involves entity recognition by extracting key entities (e.g., people, places, organizations, dates) mentioned in the query.

Additionally, in one embodiment, semantic analysis with large language model 105 involves relationship extraction by identifying the relationships between entities and their attributes.

Furthermore, in one embodiment, semantic analysis with large language model 105 involves contextual understanding by leveraging large language model's 105 ability to understand broader context and nuances of language to interpret the query's meaning.

In one embodiment, analyzer 201 utilizes various software tools for analyzing the semantics of a query as described above, including, but are not limited to, IBM Watson® Discovery, Google® Cloud NLP, SPARQL, Query Classifiers, etc.

In step 903, searching engine 202 of server 102 searches knowledge base 106 for the answer to the received query based on the analyzed semantics.

As stated above, a knowledge base, such as knowledge base 106, as used herein, refers to a centralized repository of information that stores data and knowledge related to a specific topic, product, or service. For example, the user of computing device 101 may have provided the query of "How to create a new account in a bank?" Based on analyzing the semantics of the query by analyzer 201, searching engine 202 searches knowledge base 106 for information pertaining to opening a bank account.

In one embodiment, searching engine 202 compares the meaning of the semantic representations of the knowledge base entries with the semantic representation of the received query. For example, in one embodiment, the analyzed semantics of the received query may be represented as a vector as discussed above. Furthermore, in one embodiment, the knowledge base entries are represented as vectors. For example, in one embodiment, each piece of information in the knowledge base is converted into a vector representation, such as via the word embedding technique. As a result, a numerical comparison of semantic similarity may be performed between the query and the knowledge base entries.

In one embodiment, searching engine 202 performs such a numerical comparison by performing a vector similarity search, which compares the query vector to the vectors of each knowledge base entry to identify the most semantically similar ones. In one embodiment, such results may be ranked based on relevance, such as the distance between the vectors, the context of the knowledge base entry, and any additional semantic information to refine the ranking of potential answers.

In one embodiment, searching engine 202 identifies the knowledge base entry that best matches the semantic meaning of the query as corresponding to the answer to the query.

In one embodiment, searching engine 202 searches knowledge base 106 for the answer to the query based on the analyzed semantics using various software tools, which can include, but are not limited to, IBM Watson® Discovery, Bloomfire®, etc.

In step 904, analyzer 201 of server 102 analyzes the answer to extract the conditions, decisions, and independent variables from the answer to generate a list of conditions, decisions, and independent variables.

As discussed above, conditions, as used herein, refer to the circumstances or requirements needed to make the answer valid. For example, in the answer, "The return policy is 30 days for most items, provided the product is unused and in original packaging," the conditions correspond to 30 days, unused and original packaging. Decisions, as used herein, refer to the information used to select the most appropriate response to the query. For example, in response to the query "What is the best restaurant near me?", the AI chatbot generates the answer "Based on your location, the top-rated restaurants nearby are [list of options]." In such an answer, the decision is the location of the user, since based on such a location of the user, the top-rated restaurants are generated. Independent variables, as used herein, refer to the main actions, aspects, or headings in an answer that identify the key ideas, steps, or information in the answer. Such variables are not necessarily influenced by other variables in the answer.

In one embodiment, analyzer 201 analyzes the answer to extract the conditions, decisions, and independent variables from the answer to generate a list of conditions, decisions, and independent variables using a large language module 105 that is focused on natural language understanding in the context of extracted conditions, decisions, and independent variables. In one embodiment, analyzer 201 analyzes the answer to extract the conditions, decisions, and independent variables from the answer to generate a list of conditions, decisions, and independent variables using such a large language module 105 by using natural language processing (NLP) techniques to parse the text, extract key phrases, and identify patterns related to conditional statements ("if-then" logic), decision points ("choose this option"), and factors that influence the outcome (independent variables) based on the context of the conversation and the AI chatbot's reasoning process.

In one embodiment, analyzer 201 analyzes the answer to extract the conditions, decisions, and independent variables from the answer to generate a list of conditions, decisions, and independent variables by first breaking down the text into individual words or meaningful units ("tokens") to facilitate the analysis. Furthermore, in one embodiment, analyzer 201 then performs part-of-speech tagging, which includes identifying the grammatical role of each word (noun, verb, adjective) to understand the sentence structure.

In one embodiment, following tokenization and part-of-speech tagging, analyzer 201 performs named entity recognition, which involves recognizing and classifying named entities, such as people, places, organizations, and dates within the text.

Furthermore, in one embodiment, analyzer 201 then performs dependency parsing and keyword extraction followed by semantic analysis. Dependency parsing involves analyzing the grammatical relationships between words in a sentence to understand the logical flow of the answer. Keyword extraction involves identifying key phrases or terms that indicate conditions, decisions, or independent variables based on predefined patterns or trained models. Semantic analysis involves understanding the meaning of words and phrases within the context of the query to identify potential conditions and outcomes.

In one embodiment, analyzer 201 identifies specific elements, such as conditions, decisions, and independent variables. For example, in one embodiment, analyzer 201 searches for phrases, such as "if," "when," "unless," and "provided that," which signal conditional statements. In one embodiment, analyzer 201 searches for phrases, such as "choose," "select," "decide," "option," and "consider," which indicate decision points. In one embodiment, analyzer 201 identifies nouns or phrases that are explicitly mentioned as factors affecting the outcome, such as describing the reasoning behind a decision.

An example of extracting conditions, decisions, and independent variables from the answer to generate a list of conditions, decisions, and independent variables is provided in connection with FIGS. 3A-3B.

As shown in FIG. 3A, such an extraction 300, which may be performed, at least in part, with the assistance of a large language model 105, includes a list 301 of conditions, decisions, and independent variables extracted from the answer as shown by numbers 1-10 (see element 301). For example, in the answer to the query ("How to open a new account in a bank?"), analyzer 201 generates a list 301 of conditions, decisions, and independent variables extracted from the answer using a large language module 105 that is focused on natural language understanding in the context of extracted conditions, decisions, and independent variables. In such an example, list 301 includes the conditions, decisions, and independent variables of: selecting the bank, selecting account type, gathering necessary documents, visiting the bank, completing the application form, depositing initial funds, reviewing and signing documents, receiving account information, activating online banking (if applicable), and keeping records.

In one embodiment, such a list 301 of conditions, decisions, and independent variables extracted from the answer may be formatted in a sequential listing of the conditions, decisions, and independent variables extracted from the answer as shown in FIG. 3B.

Referring to FIG. 3B, such a sequential listing 303 includes a listing of the sequence 304 of the condition/decision/independent variable 305 in the order presented in the answer to the query requesting information. As illustrated in FIG. 3B, such a sequence 304 may include multiple sub-parts, which are designated as ".1, ".2," etc.

In one embodiment, analyzer 201 utilizes various software tools for analyzing the answer to extract the conditions, decisions, and independent variables from the answer to generate a list of conditions, decisions, and independent variables as discussed above, including, but are not limited to, Botium, QBox®, BotMetrics, Dashbot®, Tidio®, etc.

Referring again to FIG. 9A, in conjunction with FIGS. 1-2, 3A-3B and 4-8, in step 905, clarification recommendation module 203 of server 102 determines whether or not the answer to the query needs clarification by determining if the number of extracted conditions, decisions, and independent variables from the generated list of conditions, decisions, and independent variables exceeds a threshold value, which may be user-designated.

If the number of extracted conditions, decisions, and independent variables does not exceed the threshold value, then, in step 906, clarification recommendation module 203 of server 102 displays the answer to the user, such as the user of computing device 101 which issued the query requesting information, without any clarifications (such as inserting input edit boxes to enable the user to provide input regarding the associated condition, decision, or independent variable as discussed herein). In one embodiment, clarification recommendation module 203 displays the answer to the user on the display of computing device 101.

If, however, the number of extracted conditions, decisions, and independent variables exceeds the threshold value, then, in step 907, clarification recommendation module 203 of server 102 extracts the workflow from the answer to generate a tree view of the workflow.

As stated above, a "workflow," as used herein, refers to a define sequence of steps or tasks that need to be completed as discussed in the answer to the received query. A "tree view of the workflow," as used herein, refers to a visual representation of the process of the workflow, where each step in the workflow is displayed as a node in a hierarchical structure.

In one embodiment, clarification recommendation module 203 extracts the workflow from the answer to generate a tree view of the workflow using a large language module 105 that is focused on extracted workflows by identifying the key decision points and sequence steps within the answer and then visually represents them as nodes and connections on a tree diagram. In one embodiment, each node represents an action or question, and the branches show the potential paths based on user input or conditions.

In one embodiment, clarification recommendation module 203 extracts the workflow from the answer to generate a tree view of the workflow by performing text analysis, structure building, and visual representation.

In one embodiment, clarification recommendation module 203 performs text analysis by identifying keywords in the answer, such as looking for words and phrases that indicate decision points, such as "if," "else," "depending on," "choose from," etc. Furthermore, in one embodiment, clarification recommendation module 203 performs text analysis by extracting actions from the answer, such as identifying verbs and noun phrases that describe specific actions or information requests. Additionally, in one embodiment, clarification recommendation module 203 performs text analysis by recognizing conditional logic in the answer, such as identifying key phrases that suggest different paths based on user input, such as "if the user says yes, then . . . "

In one embodiment, clarification recommendation module 203 performs structure building by constructing the root node of the tree view of the workflow as corresponding to the initial prompt or greeting in the answer. Furthermore, clarification recommendation module 203 performs structure building by constructing the child nodes branching out from the parent node to correspond to each action or question identified in the text of the answer. Additionally, clarification recommendation module 203 performs structure building by creating multiple branches from a node where conditions are present, where each branch represents a potential path, such as based on the user's response.

In one embodiment, clarification recommendation module 203 performs visual representation by visually creating the tree structure, such as via a diagramming tool or software. Furthermore, clarification recommendation module 203 performs visual representation by labeling each node with the corresponding action or question from the answer. Additionally, clarification recommendation module 203 performs visual representation by connecting nodes with lines to show the sequence of steps and potential branching paths.

An example of extracting a workflow from the answer to generate a tree view of the workflow is provided in connection with FIG. 4.

Referring to FIG. 4, FIG. 4 illustrates a tree view 400 of the workflow that was extracted from the answer to the query ("How to open a new account in a bank?"). In one embodiment, such a tree view 400 includes the hierarchical listing, such as list 301 of extraction 300 of FIG. 3A.

In one embodiment, clarification recommendation module 203 utilizes various software tools for extracting the workflow from the answer to generate a tree view of the workflow including, but are not limited to, Lucidchart®, Miro®, ClickUp®, Microsoft® Power Automate, etc.

Referring again to FIG. 9A, in conjunction with FIGS. 1-2, 3A-3B and 4-8, in step 908, clarification recommendation module 203 of server 102 generates and displays the answer including a presentation of one or more of the conditions, decisions, and independent variables from the list of conditions, decisions, and independent variables that are highlighted based on the tree view of the workflow.

As discussed above, in one embodiment, such highlighting involves visually indicating that additional information is required regarding such conditions, decisions, and independent variables in order to improve the answer to the user's intended query.

In one embodiment, clarification recommendation module 203 presents only a top user-designated number of conditions, decisions, and independent variables from the list of conditions, decisions, and independent variables that are highlighted based on the tree view of the workflow as discussed herein.

In one embodiment, clarification recommendation module 203 applies a natural language processing algorithm to semantically match the conditions, decisions, and independent variables to the text of the answer for every node in tree view 400. That is, clarification recommendation module 203 uses natural language processing techniques to analyze the answer to the query at every decision point within the conversational flow to identify key elements, such as conditions, decisions, and independent variables, and comparing them to the original text to determine if they align in meaning.

In one embodiment, such an algorithm is a combination of performing n-gram token comparison, Word2Vec embedding, and the cosine similarity calculation to perform a comprehensive text similarity analysis. In one embodiment, the n-gram token comparison breaks the text of the answer into sequences of n words (n-grams), capturing local word patterns and providing a basic understanding of word proximity within a sentence. Word2Vec embedding involves converting each word in the n-grams into a vector representation using the Word2Vec model, which captures semantic meaning and relationships between words beyond their presence in the text. The cosine similarity calculation involves comparing the similarity between two text segments by calculating the cosine similarity between the respective Word2Vec vectors.

In one embodiment, clarification recommendation module 203 records the position of every condition, decision, and independent variable that occurs in the answer to the query.

In one embodiment, clarification recommendation module 203 records every occurrence of the condition, decision, and independent variable in tree view 400, such as in the format of "1.1.1," which indicates the depth and branch of tree view 400.

In one embodiment, clarification recommendation module 203 scores the importance of the condition, decision, and independent variable, where the top N conditions, decisions, and independent variables, where N is user-designated, is selected to be presented and highlighted in the answer for the user to provide feedback as discussed herein.

In one embodiment, clarification recommendation module 203 generates such a score based on the position of the condition, decision, and independent variable in tree view 400, such as the position that it is first recited in tree view 400 (referred to herein as the "first start position in response text"), and based on the length of the text of the answer (i.e., the length of the response text). Furthermore, such a position may be weighted (referred to herein as $\text{Weight}_{early}$), which may be user-designated. Additionally, in one embodiment, such a score may be based on the depth of the occurrence of the condition, decision, and independent variable in tree view 400 and based on the depth of the tree. Furthermore, such a depth of the occurrence of the condition, decision, and independent variable may be weighted (referred to herein as $\text{Weight}_{highlevel}$), which may be user-designated. Furthermore, if the condition, decision, and independent variable corresponds to a branch condition, then an add-on score (referred to herein as "adjust according to branch condition") may be added to the score thereby making the score of that branch condition higher and the score of the later condition, decision, and independent variable lower. For instance, in one embodiment, the score=(1−position in answer/length of response text)*$\text{Weight}_{early}$+(1−min(depth of occurrence in tree view)/depth of tree)*$\text{Weight}_{highlevel}$+adjust according to branch condition.

In one embodiment, clarification recommendation module 203 highlights the top N, which may be user-designated, conditions, decisions, and independent variables to be presented in the answer for the user to provide feedback.

Additionally, in one embodiment, clarification recommendation module 203 generates input edit boxes associated with such highlighted conditions, decisions, and independent variables, which enable the user to provide input regarding the associated conditions, decisions, and independent variables as illustrated in FIGS. 5 and 6.

Referring to FIG. 5, in conjunction with FIGS. 3B and 4, such a scoring may be generated in a data structure, such as table 500, which includes columns 304, 305, 501, 502, 503, 504 and 505.

Column 304 corresponds to the step in the order of steps presented in the answer to the query requesting information as discussed above. Column 305 corresponds to the condition, decision, or independent variable in question. Column 501 corresponds to the position in tree view 400 that the corresponding condition, decision, or independent variable first appeared. Column 502 corresponds to the node in tree view 400 that the condition, decision, or independent variable first appeared. Column 503 corresponds to the possible values for such conditions, decisions, and independent variables. For example, an account type could be a savings account or a checking account. Such possible values may be presented to the user via an input edit box to order to obtain further information from the user so that the answer to the user's query can be improved in order to provide the best and comprehensive answer to the user's intended query. Column 504 contains information as to whether the corresponding condition, decision, and independent variable corresponds to a branch condition. Column 505 lists the computed score.

In one embodiment, the top N, which may be user-designated, conditions, decisions, and independent variables from the list of conditions, decisions, and independent variables, may be presented and highlighted to the user for feedback as illustrated in FIG. 6.

As shown in FIG. 6, the query (Q) 601 requesting information is received by analyzer 201, where the semantics of the query are analyzed. In one embodiment, searching engine 202 searches knowledge base 106 for the answer (A) 602 to the query based on the analyzed semantics of the query.

In one embodiment, such an answer 602 includes highlighted 603 conditions, decisions, and independent variables that are presented to the user to provide feedback. Such conditions, decisions, and independent variables are highlighted to indicate to the user that more information is being requested concerning these conditions, decisions, and independent variables.

Furthermore, in one embodiment, clarification recommendation module 203 generates input edit boxes 604 associated with such highlighted conditions, decisions, and independent variables. In one embodiment, such input edit boxes 604 correspond to pull-down menus which allow the user to select a value (e.g., which type of bank account) out of a listing of values (e.g., savings account, checking account).

Referring to FIG. 9B, in conjunction with FIGS. 1-2, 3A-3B and 4-8, in step 909, clarification recommendation module 203 of server 102 receives input regarding one or more of the highlighted conditions, decisions, and independent variables. In one embodiment, such input is received from the user of computing device 101 that issued the query requesting information.

In step 910, clarification recommendation module 203 of server 102 generates a recommended query based on the received input.

As stated above, for example, if the user provided feedback that indicated that the bank was the "Bank of Money," the type of account was a "savings account," and the identification used was an "ID card," then the query may be reformulated to correspond to "How to create a new account in a bank given that the bank is the Bank of Money, the account is a savings account, and the identification is an ID card?"

Based on the recommended query, the semantics of such a revised query is analyzed by analyzer 201 in step 902 and the above-described process continues. For example, searching engine 202 searches knowledge base 106 for a second answer to the revised query based on the analyzed semantics of the revised query. The second answer is then analyzed to extract the conditions, decisions, and independent variables from the second answer to generate a list of conditions, decisions, and independent variables. If the number of conditions, decisions, and independent variables extracted from the second answer is below (i.e., does not exceed) a threshold number, which may be user-designated, then the process is completed and the second answer is presented to the user as a final answer without any feedback requests, such as via input edit boxes. If, however, the number of conditions, decisions, and independent variables extracted from the second answer is still not below the threshold number, then the process continues as described above resulting in the second answer being presented to the user including highlighted conditions, decisions, and independent variables for which the user is requested to provide feedback as illustrated in FIG. 7.

As shown in FIG. 7, the revised query (Q) 701 (e.g., How to create a new account in a bank given that the bank is the Bank of Money, the account is a savings account, and the identification is an ID card?) requesting information is received by analyzer 201, where the semantics of the query are analyzed. In one embodiment, searching engine 202 searches knowledge base 106 for the answer (A) 702 to the revised query based on the analyzed semantics of the query.

In one embodiment, such an answer 702 includes highlighted 703 conditions, decisions, and independent variables (e.g., type of savings account, initial deposit) that are presented to the user to provide feedback. Such conditions, decisions, and independent variables are highlighted to indicate to the user that more information is being requested concerning these conditions, decisions, and independent variables.

Furthermore, in one embodiment, clarification recommendation module 203 generates input edit boxes 704 associated with such highlighted conditions, decisions, and independent variables. In one embodiment, such input edit boxes 704 correspond to pull-down menus which allow the user to select a value (e.g., the value of initial deposit) out of a listing of values (e.g., 0, $100, $200).

In one embodiment, upon receiving input from the user regarding one or more of the highlighted conditions, decisions, and independent variables, clarification recommendation module 203 generates a further recommended query based on the received input and the above-described process is repeated.

In this manner, the artificial intelligence chatbot is enabled to provide information that is the best and comprehensive answer to the user's intended query.

Furthermore, the principles of the present disclosure improve the technology or technical field involving artificial intelligence chatbots.

As discussed above, AI chatbots are designed to understand a user's needs, preferences, and intent without the need for a human operator. For example, AI chatbots use natural language processing (NLP) and machine learning (ML) to understand and respond to user queries. They can adapt to user inputs over time and handle a wider range of issues more accurately and efficiently than traditional chatbots. AI chatbots are used in a variety of applications, including customer service. For example, AI chatbots are used for answering frequently asked questions, providing product recommendations, and facilitating transactions. AI chatbots are also used in e-commerce (e.g., providing personalized recommendations), healthcare (e.g., performing patient intake and appointment scheduling), market research (e.g., collecting survey responses), education (e.g., helping students with their homework), etc. Unfortunately, such AI chatbots, such as OpenAI's ChatGPT®, may sometimes provide information that is not the best and comprehensive answer to the user's intended query. In certain situations, the AI chatbot does not provide the best and comprehensive answer to the user's query because the user did not formulate the query properly in order to correctly ask the intended question. While attempts have been made to rephrase queries to the AI chatbot to better align with the user's intended meaning, such as providing additional context, such techniques are deficient in enabling the AI chatbot to provide information that is the best and comprehensive answer to the user's intended query.

Embodiments of the present disclosure improve such technology by analyzing a first answer to a query requesting information to extract conditions, decisions, and independent variables from the first answer. The first answer is generated and displayed to the user providing the query, where the first answer includes one or more of the extracted conditions, decisions, and independent variables which are highlighted to indicate to the user to provide feedback regarding such extracted conditions, decisions, and independent variables. After receiving input from the user regarding the highlighted conditions, decisions, and independent variables, a new query (referred to herein as the "recommended query") is generated. A new answer (a second answer) is then generated by the artificial intelligence chatbot based on this new or recommended query. The above-described process is repeated until the number of conditions, decisions, and independent variables identified in the answer is below (i.e., does not exceed) a threshold number, which may be user-designated. In this manner, the artificial intelligence chatbot is enabled to provide information that is the best and comprehensive answer to the user's intended query. Furthermore, in this manner, there is an improvement in the technical field involving artificial intelligence chatbots.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating a more accurate answer by an artificial intelligence chatbot, the method comprising:

receiving a query requesting information;

analyzing semantics of said query;

searching a knowledge base for a first answer to said query based on said analyzed semantics of said query;

analyzing said first answer to extract conditions, decisions, and independent variables in said first answer, wherein said conditions are circumstances or requirements needed to make an answer valid, wherein said decisions are information used to select a response to said query, and wherein said independent variables are main actions, aspects, or headings in an answer that identify key ideas, steps, or information in said answer;

generating and displaying said first answer including one or more of said extracted conditions, decisions, and independent variables which are highlighted in said first answer by applying a natural language processing algorithm to semantically match said conditions, decisions, and independent variables in text of said first answer for every node in a tree view of a workflow that was extracted from said first answer;

receiving input regarding said highlighted one or more conditions, decisions, and independent variables in said first answer;

generating a recommended query based on said received input;

analyzing semantics of said recommended query; and searching said knowledge base for a second answer to said recommended query based on said analyzed semantics of said recommended query.

2. The method as recited in claim 1 further comprising:

extracting said conditions, decisions, and independent variables from said first answer to generate a list of conditions, decisions, and independent variables.

3. The method as recited in claim 2, wherein a first large language model is used to search said knowledge base for said first answer, wherein a second large language model is used for extracting said conditions, decisions, and independent variables from said first answer and used for extracting said workflow from said first answer.

4. The method as recited in claim 2 further comprising:

generating and displaying said first answer including said highlighted one or more conditions, decisions, and independent variables from said list of conditions, decisions, and independent variables based on said tree view of said workflow.

5. The method as recited in claim 4, wherein a presentation of said one or more conditions, decisions, and independent variables comprises input edit boxes associated with each of said one or more condition, decisions, and independent variables, wherein said input edit boxes enable a user to provide input regarding the associated condition, decision, or independent variable.

6. The method as recited in claim 1 further comprising:

analyzing said second answer to identify one or more further conditions, decisions, and independent variables in said second answer.

7. The method as recited in claim 6 further comprising:

displaying said second answer without any clarifications to said user in response to a number of said identified further conditions, decisions, and independent variables in said second answer not exceeding a threshold number.

8. A computer program product for generating a more accurate answer by an artificial intelligence chatbot, the computer program product comprising one or more computer readable storage mediums having program code embodied therewith, the program code comprising programming instructions for:

receiving a query requesting information;

analyzing semantics of said query;

searching a knowledge base for a first answer to said query based on said analyzed semantics of said query;

analyzing said first answer to extract conditions, decisions, and independent variables in said first answer, wherein said conditions are circumstances or requirements needed to make an answer valid, wherein said decisions are information used to select a response to said query, and wherein said independent variables are main actions, aspects, or headings in an answer that identify key ideas, steps, or information in said answer;

generating and displaying said first answer including one or more of said extracted conditions, decisions, and independent variables which are highlighted in said first answer by applying a natural language processing algorithm to semantically match said conditions, decisions, and independent variables in text of said first answer for every node in a tree view of a workflow that was extracted from said first answer;

receiving input regarding said highlighted one or more conditions, decisions, and independent variables in said first answer;

generating a recommended query based on said received input;

analyzing semantics of said recommended query; and searching said knowledge base for a second answer to said recommended query based on said analyzed semantics of said recommended query.

9. The computer program product as recited in claim 8, wherein the program code further comprises the programming instructions for:

extracting said conditions, decisions, and independent variables from said first answer to generate a list of conditions, decisions, and independent variables.

10. The computer program product as recited in claim 9, wherein a first large language model is used to search said knowledge base for said first answer, wherein a second large language model is used for extracting said conditions, decisions, and independent variables from said first answer and used for extracting said workflow from said first answer.

11. The computer program product as recited in claim 9, wherein the program code further comprises the programming instructions for:

generating and displaying said first answer including said highlighted one or more conditions, decisions, and independent variables from said list of conditions, decisions, and independent variables based on said tree view of said workflow.

12. The computer program product as recited in claim 11, wherein a presentation of said one or more conditions, decisions, and independent variables comprises input edit boxes associated with each of said one or more condition, decisions, and independent variables, wherein said input edit boxes enable a user to provide input regarding the associated condition, decision, or independent variable.

13. The computer program product as recited in claim 8, wherein the program code further comprises the programming instructions for:

analyzing said second answer to identify one or more further conditions, decisions, and independent variables in said second answer.

14. The computer program product as recited in claim 13, wherein the program code further comprises the programming instructions for:

displaying said second answer without any clarifications to said user in response to a number of said identified further conditions, decisions, and independent variables in said second answer not exceeding a threshold number.

15. A system, comprising:

a memory for storing a computer program for generating a more accurate answer by an artificial intelligence chatbot; and a processor connected to said memory, wherein said processor is configured to execute program instructions of the computer program comprising:

receiving a query requesting information;

analyzing semantics of said query;

searching a knowledge base for a first answer to said query based on said analyzed semantics of said query;

analyzing said first answer to extract conditions, decisions, and independent variables in said first answer, wherein said conditions are circumstances or requirements needed to make an answer valid, wherein said decisions are information used to select a response to said query, and wherein said independent variables are main actions, aspects, or headings in an answer that identify key ideas, steps, or information in said answer;

generating and displaying said first answer including one or more of said extracted conditions, decisions, and independent variables which are highlighted in said first answer by applying a natural language processing algorithm to semantically match said conditions, decisions, and independent variables in text of said first answer for every node in a tree view of a workflow that was extracted from said first answer;

receiving input regarding said highlighted one or more conditions, decisions, and independent variables in said first answer;

generating a recommended query based on said received input;

analyzing semantics of said recommended query; and searching said knowledge base for a second answer to said recommended query based on said analyzed semantics of said recommended query.

16. The system as recited in claim 15, wherein the program instructions of the computer program further comprise:

extracting said conditions, decisions, and independent variables from said first answer to generate a list of conditions, decisions, and independent variables.

17. The system as recited in claim 16, wherein a first large language model is used to search said knowledge base for said first answer, wherein a second large language model is used for extracting said conditions, decisions, and independent variables from said first answer and used for extracting said workflow from said first answer.

18. The system as recited in claim 16, wherein the program instructions of the computer program further comprise:

generating and displaying said first answer including said highlighted one or more conditions, decisions, and independent variables from said list of conditions, decisions, and independent variables based on said tree view of said workflow.

19. The system as recited in claim 18, wherein a presentation of said one or more conditions, decisions, and independent variables comprises input edit boxes associated with each of said one or more condition, decisions, and independent variables, wherein said input edit boxes enable a user to provide input regarding the associated condition, decision, or independent variable.

20. The system as recited in claim 15, wherein the program instructions of the computer program further comprise:

analyzing said second answer to identify one or more further conditions, decisions, and independent variables in said second answer.

* * * * *